United States Patent
Hino et al.

(10) Patent No.: US 11,099,030 B2
(45) Date of Patent: Aug. 24, 2021

(54) ATTITUDE ESTIMATION APPARATUS, ATTITUDE ESTIMATION METHOD, AND OBSERVATION SYSTEM

(71) Applicant: Mitsubishi Electric Corporation, Tokyo (JP)

(72) Inventors: Momoyo Hino, Tokyo (JP); Hideaki Maehara, Tokyo (JP); Kenji Taira, Tokyo (JP); Sumio Kato, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 399 days.

(21) Appl. No.: 16/099,805

(22) PCT Filed: Jun. 2, 2016

(86) PCT No.: PCT/JP2016/066444
§ 371 (c)(1),
(2) Date: Nov. 8, 2018

(87) PCT Pub. No.: WO2017/208424
PCT Pub. Date: Dec. 7, 2017

(65) Prior Publication Data
US 2019/0293450 A1    Sep. 26, 2019

(51) Int. Cl.
*G01C 23/00* (2006.01)
*G01C 15/00* (2006.01)
(Continued)

(52) U.S. Cl.
CPC .............. *G01C 23/00* (2013.01); *B64C 27/28* (2013.01); *B64C 39/02* (2013.01); *B64C 39/024* (2013.01);
(Continued)

(58) Field of Classification Search
CPC ... B64C 2201/146; B64C 27/28; B64D 47/08; G01C 23/00
See application file for complete search history.

(56) References Cited

U.S. PATENT DOCUMENTS 10,133,279 B2 * 11/2018 Shin .................... G06K 9/00664
10,307,910 B2 *  6/2019 Shin .................... G05D 1/0253
(Continued)

FOREIGN PATENT DOCUMENTS

JP        8-268393 A    10/1996
JP    2004-177252 A     6/2004
(Continued)

*Primary Examiner* — Peter D Nolan
*Assistant Examiner* — Ce Li Li
(74) *Attorney, Agent, or Firm* — Birch, Stewart, Kolasch & Birch, LLP.

(57) ABSTRACT

An attitude estimation apparatus (30) includes: a data acquiring unit (32) for acquiring observation data; a range-measurement point coordinate calculator (33A) for calculating geodetic coordinates of a range-measurement point in a geodetic coordinate system using positioning data, ranging data, actual attitude data, and an estimated value of an unknown parameter representing an attitude of a flying object; an image coordinate calculator (33B) for calculating coordinates of a projected point by performing projection transformation from the geodetic coordinate system to an image coordinate system on the geodetic coordinates; an image matching processor (34) for detecting image coordinates of the range-measurement point appearing in a first captured image by executing image matching between the first captured image and a second captured image selected from captured images; and an attitude estimator (35) for correcting the estimated value such that a magnitude of a difference between the coordinates of the projected point and the image coordinates decreases.

15 Claims, 25 Drawing Sheets

(51) Int. Cl.
    *G01C 21/00*    (2006.01)
    *G05D 1/10*    (2006.01)
    *B64C 39/02*    (2006.01)
    *G01C 21/20*    (2006.01)
    *B64D 47/08*    (2006.01)
    *B64C 27/28*    (2006.01)

(52) U.S. Cl.
    CPC ............ *B64D 47/08* (2013.01); *G01C 15/00* (2013.01); *G01C 15/002* (2013.01); *G01C 21/20* (2013.01); *G05D 1/101* (2013.01); *B64C 2201/146* (2013.01)

(56) References Cited

U.S. PATENT DOCUMENTS

| | | | | |
|---|---|---|---|---|
| 2001/0038718 | A1* | 11/2001 | Kumar | G06T 7/35 382/284 |
| 2015/0146015 | A1* | 5/2015 | Sommerlade | G06F 3/0488 348/187 |
| 2015/0206023 | A1* | 7/2015 | Kochi | G06T 15/20 382/199 |
| 2016/0076892 | A1* | 3/2016 | Zhou | G01C 21/165 701/3 |

FOREIGN PATENT DOCUMENTS

| | | |
|---|---|---|
| JP | 2007-240506 A | 9/2007 |
| JP | 2013-96745 A | 5/2013 |
| JP | 2014-35702 A | 2/2014 |
| JP | 2014-89078 A | 5/2014 |
| JP | 2014-145762 A | 8/2014 |
| JP | 2014-145784 A | 8/2014 |

\* cited by examiner

| Location ID | Latitude | Longitude | Date | Time |
|---|---|---|---|---|
| A1 | LAT1 | LNG1 | 2016/yy/zz | 10:30:30 |
| A2 | LAT2 | LNG2 | 2016/yy/zz | 10:31:30 |
| A3 | LAT2 | LNG2 | 2016/yy/zz | 10:32:00 |
| A4 | LAT3 | LNG3 | 2016/yy/zz | 10:34:00 |
| A5 | LAT4 | LNG4 | 2016/yy/zz | 10:36:00 |
| A6 | LAT5 | LNG5 | 2016/yy/zz | 10:38:00 |
| ⋮ | ⋮ | ⋮ | ⋮ | ⋮ |

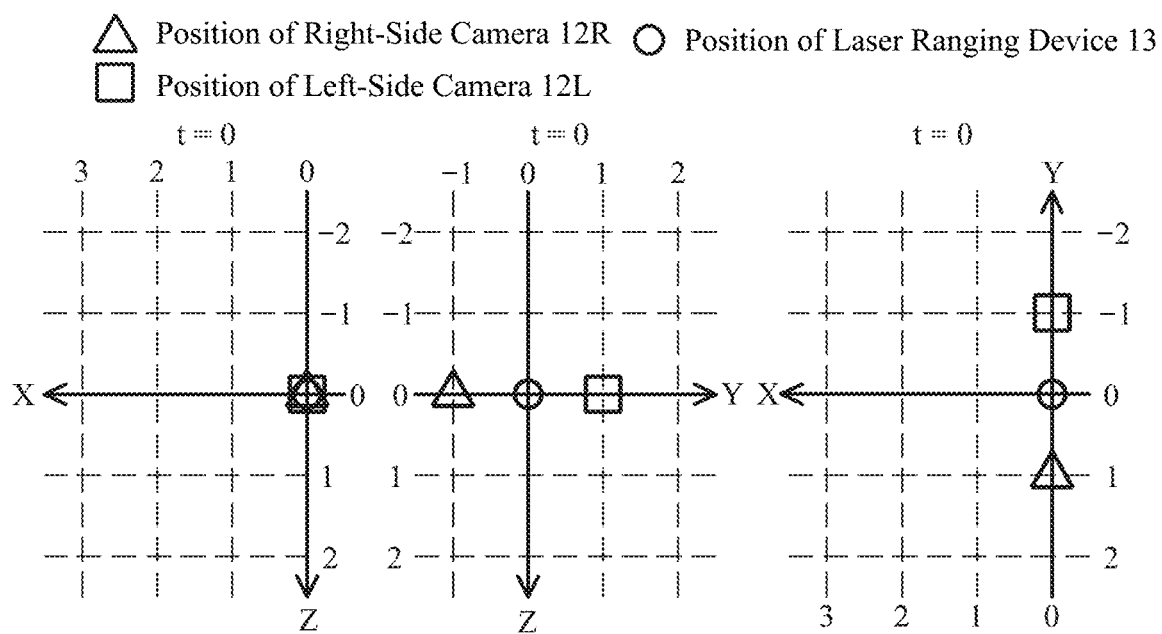

| t | θ | L |
|---|---|---|
| 0.00 | 63.0 | 9.17 |
| 0.05 | 81.0 | 9.24 |
| 0.10 | 99.0 | 10.29 |
| 0.15 | 117.0 | 11.95 |
| 1.00 | 63.0 | 10.43 |
| 1.05 | 81.0 | 9.62 |
| 1.10 | 99.0 | 10.02 |
| 1.15 | 117.0 | 10.37 |
| 2.00 | 63.0 | 8.14 |
| 2.05 | 81.0 | 7.23 |
| 2.10 | 99.0 | 8.27 |
| 2.15 | 117.0 | 11.24 |

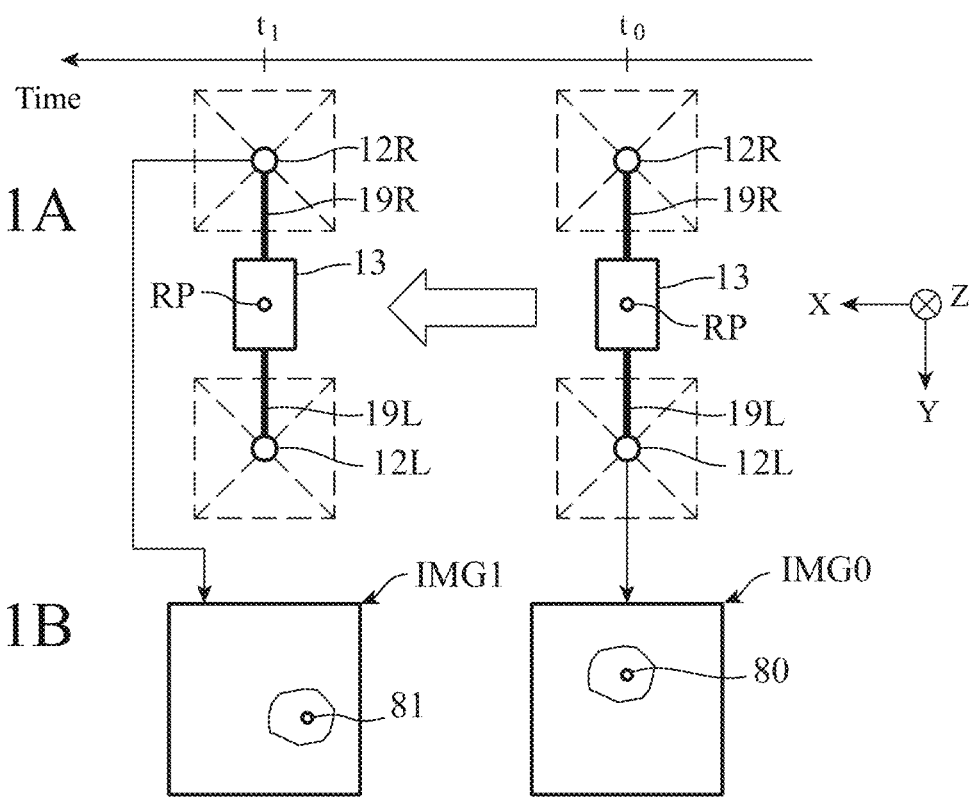
FIG. 21A
FIG. 21B
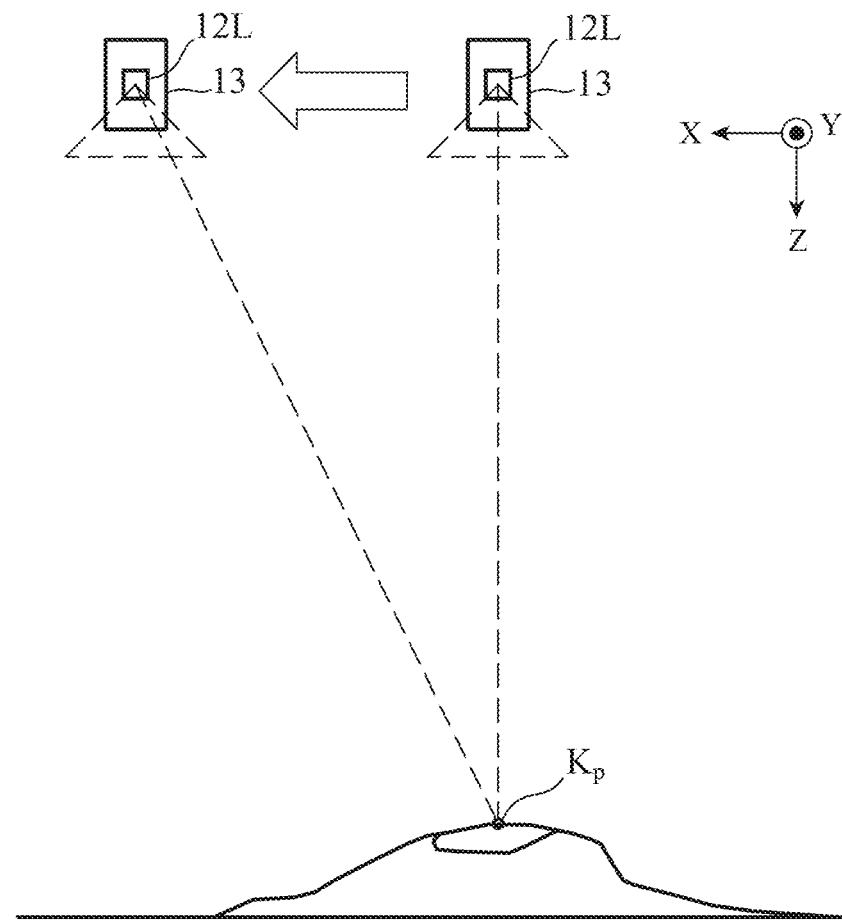
FIG. 21C

FIG. 23A

| t | θ | L | $X_O$ | $Y_O$ | $Z_O$ | ω | φ | κ | $X_G$ | $Y_G$ | $Z_G$ | p |
|---|---|---|---|---|---|---|---|---|---|---|---|---|
| 0.00 | 63.0 | 9.17 | 0.00 | 0.00 | 0.00 | 0.00 | 0.00 | 0.00 | 0.00 | 4.16 | 8.17 | 0 |
| 0.05 | 81.0 | 9.22 | 0.05 | 0.03 | 0.00 | 0.00 | 0.00 | 0.00 | 0.05 | 1.47 | 9.11 | 1 |
| 0.10 | 99.0 | 10.27 | 0.10 | 0.05 | 0.00 | 0.00 | 0.00 | 0.00 | 0.10 | −1.56 | 10.14 | 2 |
| 0.15 | 117.0 | 11.96 | 0.15 | 0.08 | 0.00 | 0.00 | 0.00 | 0.00 | 0.15 | −5.35 | 10.66 | 3 |
| 1.00 | 63.0 | 10.65 | 1.00 | 0.50 | 0.00 | 0.00 | 0.00 | 0.00 | 1.00 | 5.34 | 9.49 | 4 |
| 1.05 | 81.0 | 9.86 | 1.05 | 0.50 | 0.03 | 0.00 | 0.00 | 0.00 | 1.05 | 2.04 | 9.76 | 5 |
| 1.10 | 99.0 | 10.25 | 1.10 | 0.50 | 0.05 | 0.00 | 0.00 | 0.00 | 1.10 | −1.10 | 10.18 | 6 |
| 1.15 | 117.0 | 10.50 | 1.15 | 0.50 | 0.08 | 0.00 | 0.00 | 0.00 | 1.15 | −4.27 | 9.43 | 7 |
| 2.00 | 63.0 | 8.14 | 2.00 | 0.50 | 0.50 | 0.00 | 0.00 | 0.00 | 2.00 | 4.20 | 7.76 | 8 |
| 2.05 | 81.0 | 7.23 | 2.05 | 0.48 | 0.53 | 0.00 | 0.00 | 0.00 | 2.05 | 1.61 | 7.66 | 9 |
| 2.10 | 99.0 | 8.27 | 2.10 | 0.45 | 0.55 | 0.00 | 0.00 | 0.00 | 2.10 | −0.84 | 8.72 | 10 |
| 2.15 | 117.0 | 11.24 | 2.15 | 0.43 | 0.58 | 0.00 | 0.00 | 0.00 | 2.15 | −4.68 | 10.59 | 11 |

FIG. 23B

| t | $X_O$ | $Y_O$ | $Z_O$ | ω | φ | κ | $X_L$ | $Y_L$ | $Z_L$ | $X_R$ | $Y_R$ | $Z_R$ |
|---|---|---|---|---|---|---|---|---|---|---|---|---|
| 0 | 0.0 | 0 | 0 | 0 | 0 | 0 | 0 | −1 | 0 | 0 | 1 | 0 |
| 1 | 1.0 | 0.5 | 0 | 0 | 0 | 0 | 1 | −0.5 | 0 | 1 | 1.5 | 0 |
| 2 | 2.0 | 0.5 | 0.5 | 0 | 0 | 0 | 2 | −0.5 | 0.5 | 2 | 1.5 | 0.5 |
| 3 | 3.0 | 0 | 1 | 0 | 0 | 0 | 3 | −1 | 1 | 3 | 1 | 1 |

FIG. 24

| t | $X_O$ | $Y_O$ | $Z_O$ | $\omega$ | $\varphi$ | $\kappa$ | $X_G$ | $Y_G$ | $Z_G$ | $x_L$ | $y_L$ | $x_R$ | $y_R$ | p |
|---|---|---|---|---|---|---|---|---|---|---|---|---|---|---|
| 0.00 | 0.00 | 0.00 | 0.00 | 0.00 | 0.00 | 0.00 | | | | | | | | |
| 0.05 | 0.05 | 0.03 | 0.00 | 0.00 | 0.00 | 0.00 | 0.00 | 4.16 | 8.17 | 0.0 | −632.0 | 122.4 | −325.9 | 0 |
| 0.10 | 0.10 | 0.05 | 0.00 | 0.00 | 0.00 | 0.00 | 0.05 | 1.47 | 9.11 | −5.5 | −270.9 | 104.3 | 3.6 | 1 |
| 0.15 | 0.15 | 0.08 | 0.00 | 0.00 | 0.00 | 0.00 | 0.10 | −1.56 | 10.14 | −9.9 | 54.8 | 88.7 | 301.4 | 2 |
| 1.00 | 1.00 | 0.50 | 0.00 | 0.00 | 0.00 | 0.00 | 0.15 | −5.35 | 10.66 | −14.1 | 408.6 | 79.8 | 643.3 | 3 |
| 1.05 | 1.05 | 0.50 | 0.03 | 0.00 | 0.00 | 0.00 | 1.00 | 5.34 | 9.49 | 0.0 | −614.9 | 111.2 | −426.7 | 4 |
| 1.10 | 1.10 | 0.50 | 0.05 | 0.00 | 0.00 | 0.00 | 1.05 | 2.04 | 9.76 | −5.1 | −260.4 | 102.6 | −58.5 | 5 |
| 1.15 | 1.15 | 0.50 | 0.08 | 0.00 | 0.00 | 0.00 | 1.10 | −1.10 | 10.18 | −9.8 | 59.3 | 93.0 | 269.1 | 6 |
| 2.00 | 2.00 | 0.50 | 0.50 | 0.00 | 0.00 | 0.00 | 1.15 | −4.27 | 9.43 | −15.9 | 399.4 | 95.2 | 645.8 | 7 |
| 2.05 | 2.05 | 0.48 | 0.53 | 0.00 | 0.00 | 0.00 | 2.00 | 4.20 | 7.76 | 0.0 | −647.3 | 148.0 | −473.2 | 8 |
| 2.10 | 2.10 | 0.45 | 0.55 | 0.00 | 0.00 | 0.00 | 2.05 | 1.61 | 7.66 | −7.0 | −293.9 | 142.5 | −90.9 | 9 |
| 2.15 | 2.15 | 0.43 | 0.58 | 0.00 | 0.00 | 0.00 | 2.10 | −0.84 | 8.72 | −12.2 | 41.8 | 116.7 | 238.9 | 10 |
| | | | | | | | 2.15 | −4.68 | 10.59 | −14.9 | 414.1 | 88.6 | 592.0 | 11 |

FIG. 25

| t | i | j | $x_{Li}$ | $y_{Li}$ | $x_{Rj}$ | $y_{Rj}$ | $SCAN_x(x_{Li},y_{Li})$ | $SCAN_y(x_{Li},y_{Li})$ | p |
|---|---|---|---|---|---|---|---|---|---|
| 0.00 | 0 | 1 | 0.0 | -632.0 | 122.4 | -325.9 | 115 | -328 | 0 |
| 0.05 | 0 | 1 | -5.5 | -270.9 | 104.3 | 3.6 | 103 | 2 | 1 |
| 0.10 | 0 | 1 | -9.9 | 54.8 | 88.7 | 301.4 | 93 | 300 | 2 |
| 0.15 | 0 | 1 | -14.1 | 408.6 | 79.8 | 643.3 | 90 | 642 | 3 |
| 1.00 | 1 | 2 | 0.0 | -614.9 | 111.2 | -426.7 | 152 | -438 | 4 |
| 1.05 | 1 | 2 | -5.1 | -260.4 | 102.6 | -58.5 | 133 | -68 | 5 |
| 1.10 | 1 | 2 | -9.8 | 59.3 | 93.0 | 269.1 | 114 | 260 | 6 |
| 1.15 | 1 | 2 | -15.9 | 399.4 | 95.2 | 645.8 | 106 | 635 | 7 |
| 2.00 | 2 | 3 | 0.0 | -647.3 | 148.0 | -473.2 | 115 | -462 | 8 |
| 2.05 | 2 | 3 | -7.0 | -293.9 | 142.5 | -90.9 | 113 | -81 | 9 |
| 2.10 | 2 | 3 | -12.2 | 41.8 | 116.7 | 238.9 | 89 | 247 | 10 |
| 2.15 | 2 | 3 | -14.9 | 414.1 | 88.6 | 592.0 | 65 | 603 | 11 |

FIG. 26

$$w = \begin{bmatrix} -7.434 \\ -2.125 \\ -1.298 \\ -1.552 \\ 4.254 \\ -1.364 \\ 10.230 \\ -1.258 \\ 40.801 \\ -11.344 \\ 30.410 \\ -9.481 \\ 20.994 \\ -9.090 \\ 10.814 \\ -10.759 \\ -33.015 \\ 11.227 \\ -29.549 \\ 9.896 \\ -27.653 \\ 8.090 \\ -23.613 \\ 10.955 \end{bmatrix}$$

FIG. 27

$$\Phi = \begin{bmatrix}
-7.824 & 0.000 & 0.000 & 0.000 \\
-2.137 & 0.000 & 0.000 & 0.000 \\
-1.716 & 0.000 & 0.000 & 0.000 \\
-1.820 & 0.000 & 0.000 & 0.000 \\
3.262 & 0.000 & 0.000 & 0.000 \\
-1.549 & 0.000 & 0.000 & 0.000 \\
8.255 & 0.000 & 0.000 & 0.000 \\
-1.392 & 0.000 & 0.000 & 0.000 \\
9.387 & 1.044 & 17.669 & -9.387 \\
0.000 & -21.458 & -0.828 & -1.941 \\
2.761 & 0.283 & 16.720 & -2.761 \\
0.000 & -16.697 & -0.105 & -1.791 \\
-2.604 & -0.242 & 15.778 & 2.604 \\
0.000 & -16.327 & 0.437 & -1.623 \\
-7.919 & -0.754 & 14.869 & 7.919 \\
0.000 & -19.824 & 1.073 & -1.661 \\
0.000 & -1.414 & -18.745 & 9.551 \\
0.000 & 23.265 & 0.000 & 0.000 \\
0.000 & -0.401 & -17.762 & 2.813 \\
0.000 & 18.018 & 0.000 & 0.000 \\
0.000 & 0.307 & -16.624 & -2.633 \\
0.000 & 17.253 & 0.000 & 0.000 \\
0.000 & 0.700 & -15.493 & -7.894 \\
0.000 & 20.166 & 0.000 & 0.000
\end{bmatrix}$$

FIG. 28

$$\Delta \alpha = (\Phi^T \Phi)^{-1}(\Phi^T w)$$

$$= \begin{bmatrix} 320.402 & 17.180 & 53.205 & -165.229 \\ 17.180 & 2973.643 & 16.950 & 92.840 \\ 53.205 & 16.950 & 2247.059 & -116.838 \\ -165.229 & 92.840 & -116.838 & 345.979 \end{bmatrix} \begin{bmatrix} 1.156 \\ 0.540 \\ 1.599 \\ -0.192 \end{bmatrix} = \begin{bmatrix} 0.977 \\ 0.503 \\ 1.459 \\ -0.553 \end{bmatrix}$$

FIG. 29

| $t$ | $\omega$ | $\varphi$ | $\kappa$ |
|---|---|---|---|
| 0.00 | 0.000 | 0.000 | 0.000 |
| 1.00 | 0.000 | 0.000 | 0.977 |
| 2.00 | 0.503 | 1.459 | -0.553 |
| 3.00 | 0.000 | 0.000 | 0.000 |

ATTITUDE ESTIMATION APPARATUS, ATTITUDE ESTIMATION METHOD, AND OBSERVATION SYSTEM

TECHNICAL FIELD

The present invention relates to technology for estimating a flight attitude of a flying object such as an airplane incorporating an observation device.

BACKGROUND ART

In order to survey or investigate the ground surface or features (objects on the ground) such as structures from the sky, there are cases where a flying object incorporating an observation device such as imaging cameras and laser ranging device is used. A surveying system using this type of flying object is disclosed in Patent Literature 1 (Japanese Patent Application Publication No. 2014-145762), for example.

In the case of aeronautical laser surveying, technology for acquiring the current position of a flying object and technology for detecting a flight attitude (e.g. angles in a rolling direction, a pitching direction, and a yawing direction) of the flying object are required. The current position of the flying object can be obtained using, for example, a global navigation satellite system (GNSS) device. A GNSS device allows for detection of the current position of a flying object by receiving radio waves from GNSS satellites at certain cycles while incorporated in the airplane and analyzing the received radio waves. Meanwhile, a flight attitude of the flying object can be detected using an inertial measurement unit (IMU). However, there is the problem that the type of flying object capable of incorporating an IMU is not selective because IMUs are very expensive and require a certain restraint on the transport of the IMUs, thereby requiring careful handing. Because IMUs configured to maintain high measurement accuracy have relatively heavy weights (e.g. about 4 kg to 20 kg), it is difficult for the flying object (e.g. a small unmanned helicopter that is wirelessly remote-controlled) which has a limited carrying weight capacity (e.g. a carrying weight capacity of about 2.5 kg to 3.5 kg) to incorporate the IMU.

A surveying system disclosed in Patent Literature 1 estimates a flight attitude by executing bundle calculation using a plurality of captured images captured from two or more different positions without using an IMU. Since a surveying camera in this surveying system is supported by an attitude stabilizing mechanism called a stabilizer, a photographing direction can be maintained vertically downward regardless of the attitude of the flying object during flight.

CITATION LIST

Patent Literature

Patent Literature 1: Japanese Patent Application Publication NO. 2014-145762 (FIGS. 1, 3, and 20 and paragraphs [0152] to [0160], for example)

SUMMARY OF INVENTION

Technical Problem

In the surveying system disclosed in Patent Literature 1, there is the problem that the configuration of the surveying system becomes complicated since it is necessary to incorporate the attitude stabilizing mechanism in a flying object for always maintaining the imaging direction of the surveying camera vertically downward. Moreover, since the attitude of the flying object is estimated using captured images only, there is a limit to the estimation accuracy.

In view of the foregoing, an object of the present invention is to provide an attitude estimation apparatus, attitude estimation method, and observation system capable of estimating an attitude of a flying object with high accuracy with a simple configuration.

Solution to Problem

In accordance with one aspect of the present invention, there is provided an attitude estimation apparatus which operates in cooperation with an observation apparatus comprising: a positioning device configured to output positioning data indicating a position of a flying object in a geodetic coordinate system; a ranging device configured to measure a distance from the flying object to a range-measurement point located on a ground and measure an angular direction with respect to the range-measurement point, to thereby output ranging data; an imaging unit configured to capture images of the range-measurement point as seen from a plurality of imaging positions while incorporated in the flying object and output the captured images; and an attitude sensor configured to detect an attitude of the flying object with respect to a gravitational direction, to thereby output actual attitude data. The attitude estimation apparatus comprising: a data acquiring unit to acquire the positioning data, the ranging data, the actual attitude data, and the captured images from the observation apparatus; a range-measurement point coordinate calculator to calculate geodetic coordinates indicating a position of the range-measurement point in the geodetic coordinate system, using the positioning data, the ranging data, the actual attitude data, and estimated values of one or more unknown parameters representing the attitude of the flying object; an image coordinate calculator to calculate coordinates of a projected point by performing a projection transformation of the geodetic coordinates from the geodetic coordinate system to an image coordinate system; an image matching processor to perform image matching between a first captured image and a second captured image which are selected from the captured images, to thereby detect image coordinates of the range-measurement point appearing in the first captured image; and an attitude estimator to correct the estimated values to thereby reduce an absolute difference between the coordinates of the projected point and the image coordinates.

In accordance with another aspect of the present invention, there is provided an observation system which includes the observation apparatus and the attitude estimation apparatus.

Advantageous Effects of Invention

In accordance with the present invention, with a simple configuration, an attitude of a flying object can be estimated with high accuracy.

BRIEF DESCRIPTION OF DRAWINGS

FIG. 11 is a table illustrating an example of three-dimensional coordinates of emission reference points RP of the laser ranging device at times of t=0, 1, 2, and 3 in a tabular format.

FIGS. 12A to 12C are graphs illustrating position coordinates of the laser ranging device, the right-side camera, and the left-side camera at a time of t=0.

FIG. 21A is a diagram schematically illustrating arrangement of the observation apparatus of the first embodiment at times of t=$t_0$ and $t_1$, FIG. 21B is a diagram illustrating an example of captured images separately acquired at times of t=$t_0$ and $t_1$, and FIG. 21C is a diagram schematically illustrating a positional relation between the observation apparatus and a range-measurement point at times of t=$t_0$ and $t_1$.

FIGS. 23A and 23B are tables illustrating numerical examples of observation results and calculation results in accordance with the first embodiment in a tabular format.

FIG. 24 is a table illustrating numerical examples of other observation results and calculation results in accordance with the first embodiment in a tabular format.

FIG. 25 is a table illustrating numerical examples of image coordinates in a tabular format.

FIG. 26 is a figure illustrating an example of calculation of an error vector.

FIG. 27 is a figure illustrating an example of a design matrix.

FIG. 28 is a figure illustrating a calculation example of a correction vector.

FIG. 29 is a table illustrating calculation results of attitude angles at times of t=0.00 to 3.00 in a tabular format.

DESCRIPTION OF EMBODIMENTS

Hereinafter, various embodiments of the present invention will be described in detail with reference to the drawings. In the overall drawings, components denoted by the same reference sign have the same configuration and the same function.

First Embodiment

Figure 1:
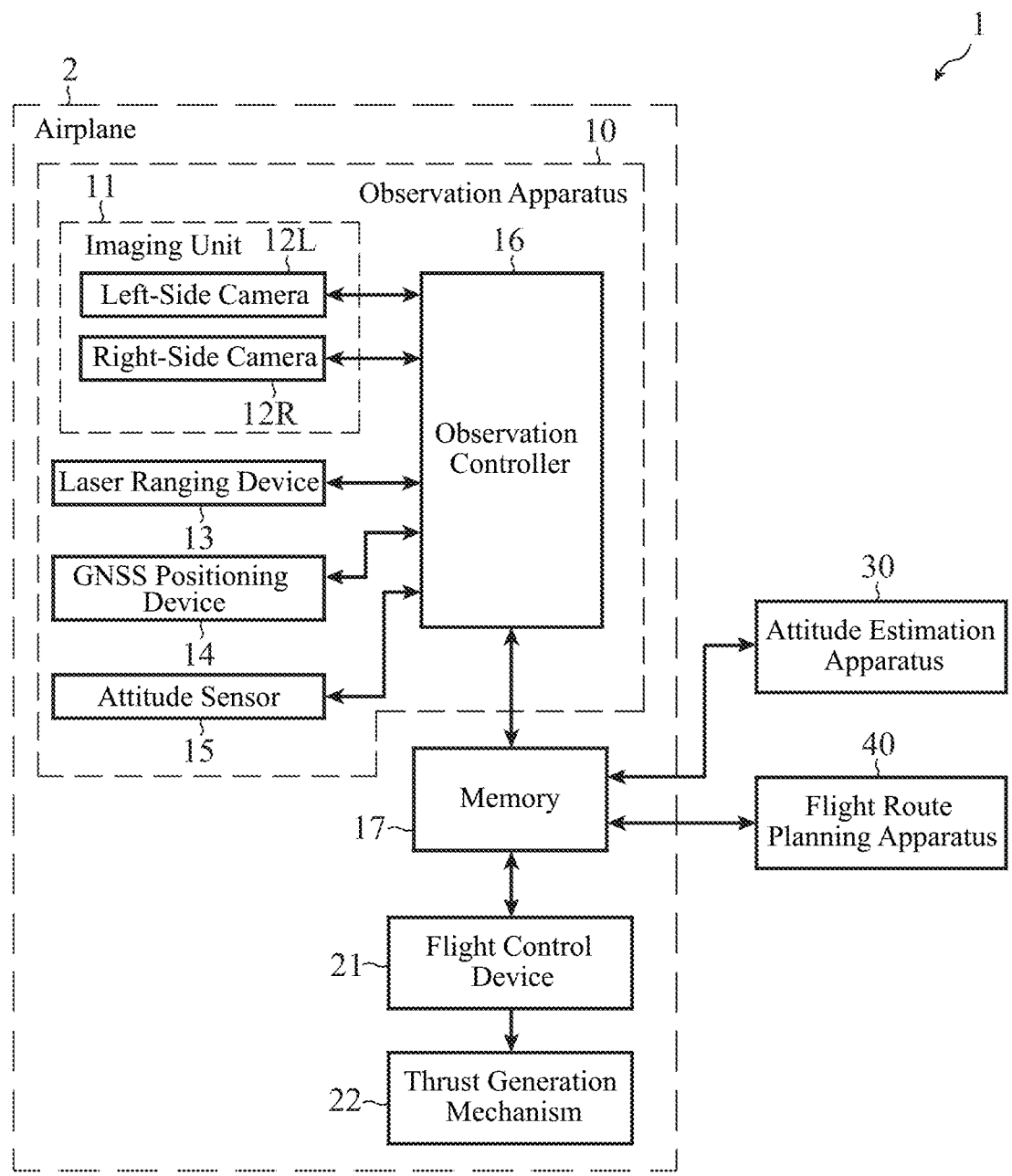
FIG. 1 is a block diagram illustrating a schematic configuration of an observation system of a first embodiment in accordance with the present invention.

FIG. 1 is a block diagram illustrating a schematic configuration of an observation system 1 of a first embodiment in accordance with the present invention. As illustrated in FIG. 1, the observation system 1 includes an observation apparatus 10 used while incorporated in an airplane 2 which is a flying object, a memory 17 in which observation data obtained by the observation apparatus 10 is stored, an attitude estimation apparatus 30 for estimating a flight attitude (attitude during flight) of the airplane 2 on the basis of the observation data, and a flight route planning apparatus 40 for setting a flight route of the airplane 2. An attitude state of the airplane 2 at a certain moment can be identified by a combination of three rotation angles with reference to the gravitational direction. For example, an attitude state of the airplane 2 can be specified by a combination of three rotation angles of a roll angle, a pitch angle, and a yaw angle, which are attitude angles in a rolling direction, a pitching direction, and a yawing direction of the airplane 2.

Note that the attitude estimation apparatus 30 and flight route planning apparatus 40 of the present embodiment are arranged to be physically independent of the airplane 2, although no limitation thereto is intended. One or both of the attitude estimation apparatus 30 and the flight route planning apparatus 40 may be incorporated in the airplane 2.

The airplane 2 includes a thrust generation mechanism 22 for generating thrust (propulsive force) of the airplane 2, a memory 17, and a flight control device 21 for controlling the operation of the thrust generation mechanism 22 using data stored in the memory 17. The airplane 2 may be a manned airplane operated by a pilot onboard the airplane 2 or may be an unmanned aerial vehicle (UAV). The thrust generation mechanism 22 has a thrust generation source such as a propeller, a rotor, or a jet engine for forming a fixed-wing airplane or a rotary-wing airplane. The flight control device 21 is capable of automatically controlling the position and the attitude of the airframe by controlling the thrust generation mechanism 22 and controlling the speed, a course, and the attitude of the airframe by controlling the thrust generation mechanism 22 in accordance with route data (data defining a flight route) stored in the memory 17. The route data is set by the flight route planning apparatus 40. A configuration of the flight route planning apparatus 40 will be described later.

As the memory 17, for example, a portable recording medium which is a portable nonvolatile memory such as a secure digital (SD) memory card can be used. The memory 17 is used not only for storing the route data but also for storing observation data (captured images, ranging data, positioning data, and actual attitude data) obtained by the observation apparatus 10, and a data acquisition cycle in the observation apparatus 10.

Figure 2:
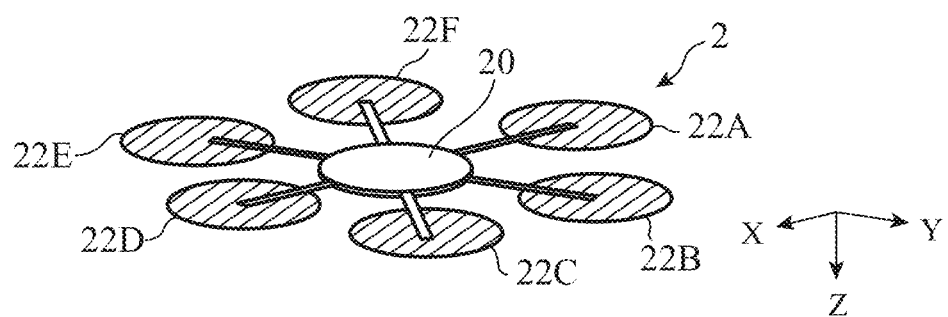
FIG. 2 is a schematic perspective view illustrating an example of a flying object of the first embodiment.

FIG. 2 is a perspective view illustrating a configuration example of the airplane 2. The airplane 2 illustrated in FIG. 2 is an unmanned aerial vehicle (UAV) having an airframe 20 and a plurality of thrust generators 22A to 22F attached to a peripheral part of the airframe 20. Although not illustrated, the airframe 20 is attached with the observation apparatus 10, the memory 17, and the flight control device 21 illustrated in FIG. 1. Each of the thrust generators 22A to 22F includes a rotary wing (rotor). The flight control device 21 is capable of causing the airplane 2 to fly along a flight route defined by route data read out from the memory 17. That is, the flight control device 21 is capable of causing the airplane 2 to ascend or descend along the Z-axis direction in FIG. 2, to move horizontally at a specified flight speed along a desired direction on an X-Y plane, or to stop (hover) in the air for a specified period of time by individually controlling operations of the thrust generators 22A to 22F depending on the route data. The observation apparatus 10 is attached to a lower part of the airframe 20 such that observation can be performed vertically downward (positive direction in the Z axis).

As illustrated in FIG. 1, the observation apparatus 10 includes an imaging unit 11 for capturing an image of the ground, a laser ranging device 13 for measuring the distance from the airplane 2 to one or more range-measurement points on the ground and angular directions thereof, a GNSS positioning device 14 for measuring the current position of the observation apparatus 10 using a plurality of global navigation satellite system (GNSS) satellites, an attitude sensor 15 for outputting actual attitude data by detecting an attitude of the airplane 2 with reference to the gravitational direction, and an observation controller 16 for individually controlling the operations of the imaging unit 11, the laser ranging device 13, the GNSS positioning device 14, and the attitude sensor 15.

The imaging unit 11 includes a left-side camera 12L as a first imaging unit and includes a right-side camera 12R as a second imaging unit. Each of the left-side camera 12L and the right-side camera 12R may include, for example, a digital camera having an optical lens and a solid-state imaging element. The solid-state imaging element may be a charge-coupled device (CCD) image sensor or a complementary metal oxide semiconductor (CMOS) image sensor. An arrangement example of the right-side camera 12R and the left-side camera 12L will be described later. The observation controller 16 stores each captured image captured by the imaging unit 11 in the memory 17 in association with an observation date and time (imaging date and time).

The observation controller 16 is capable of controlling the left-side camera 12L and the right-side camera 12R to capture images of the ground surface for every predetermined data acquisition cycle, that is, an imaging cycle (e.g. every one second) stored in the memory 17. With regard to the imaging cycle, a user can set a value of the imaging cycle using the flight route planning apparatus 40 before actual flight of the airplane 2.

The laser ranging device 13 emits laser light toward the ground surface which is the surveying object, while changing the radiation emission angle, and separately receives reflected laser light from one or more range-measurement points on the ground surface. On the basis of the result of detection of the received light, the laser ranging device 13 is capable of measuring a distance L from a reference point of the observation apparatus 10 (specifically, an emission reference point of the laser ranging device 13) to each of the range-measurement points, and measuring a radiation emission angle $\theta$ indicating an angular direction with respect to each of the range-measurement points. The laser ranging device 13 can measure a propagation time in accordance with a time of flight (TOF) method, for example, between a time when the laser light is emitted toward each of the range-measurement points and a time when the reflected laser light returns, and measures the distance L and the radiation emission angle $\theta$ to each of the range-measurement points on the basis of the measurement result. For the radiation emission angle $\theta$, an angle from a predetermined specific direction is measured. The observation controller 16 stores ranging data indicating the distance L and the radiation emission angle $\theta$ to each of the range-measurement points in the memory 17 in association with the observation date and time (ranging date and time).

The GNSS positioning device 14 receives navigation signals from a global navigation satellite system (GNSS) from a plurality of GNSS satellites and positions the current position of the observation apparatus 10 in a geodetic coordinate system (specifically, the current position of the emission reference point of the laser ranging device 13) on the basis of the navigation signals. Positioning data indicating the positioning result is output to the observation controller 16. For example, a world geodetic system (WGS)-84 coordinate system or an international terrestrial reference frame (ITRF) coordinate system may be used as the geodetic coordinate system, although no limitation thereto is intended. As a GNSS, for example, the global positioning system (GPS) operated by the United States, the global navigation satellite system (GLONASS) operated by the Russian Federation, the Galileo system operated by the European Union, or the quasi-zenith satellite system (QZSS) operated by Japan can be used. The observation controller 16 stores the positioning data in the memory 17 in association with the observation time (positioning time).

The observation controller 16 is capable of controlling the GNSS positioning device 14 to execute positioning for every predetermined data acquisition cycle, that is, a positioning cycle (e.g. every one second) stored in the memory 17. With regard to the positioning cycle, a user can set a value of the positioning cycle using the flight route planning apparatus 40 before actual flight of the airplane 2. The observation controller 16 may cause the GNSS positioning device 14 to perform positioning with a positioning cycle synchronized with the above imaging cycle.

In this regard, it is assumed that a difference between the positioning reference point of the GNSS positioning device 14 and the emission reference point of the laser ranging device 13 is within an allowable range with respect to the measurement accuracy of the GNSS positioning device 14. In other words, the positioning reference point of the GNSS positioning device 14 is regarded as being located at the same position as the emission reference point of the laser ranging device 13. In the present embodiment, the position of the emission reference point of the laser ranging device 13 is regarded as the position of the observation apparatus 10.

The attitude sensor 15 detects a direction of the gravitational acceleration which is static acceleration, that is, the gravitational direction, and detects angle information between the gravitational direction and a reference direction of the attitude sensor 15, as actual attitude data. Specifically, the attitude sensor 15 is capable of detecting, as the actual attitude data, a combination of a roll angle which is a rotation angle around a traveling direction of the airplane 2 (that is, the X-axis direction) and a pitch angle which is a rotation angle around a Y axis perpendicular to both the traveling direction and the gravitational direction (that is, the Z-axis direction). The attitude sensor 15 as described above may be, for example, a biaxial gravitational-direction sensor capable of detecting two rotation angles by itself, or a combination of two uniaxial gravitational-direction sensors. Here, two reference axes of the biaxial acceleration sensor or two reference axes of the combination of the two uniaxial acceleration sensors are arranged so as to intersect with each other at 90 degrees. Furthermore, the biaxial gravitational-direction sensor or the uniaxial gravitational-direction sensor can be configured by, for example, a piezoresistive type or capacitance type acceleration sensor, or may be configured as a micro electro mechanical systems (MEMS) device.

The airplane 2 of the present embodiment hovers at every cycle determined by preset route data. During hovering, the attitude sensor 15 detects a combination of the roll angle and the pitch angle of the airplane 2 as the actual attitude data. The observation controller 16 stores the actual attitude data in the memory 17 in association with the observation date and time (detection date and time). When the airplane 2 is inclined from the horizontal state, at least one of the three types of attitude angles of the roll angle around the X axis direction, the pitch angle around the Y axis direction, and the yaw angle around the Z axis direction has a value which is not zero. In order to specify the complete attitude state of the airplane 2 at a certain time, it is necessary to acquire not only the roll angle and the pitch angle but also the yaw angle. This yaw angle is estimated by the attitude estimation apparatus 30 as will be described later.

Figure 3:
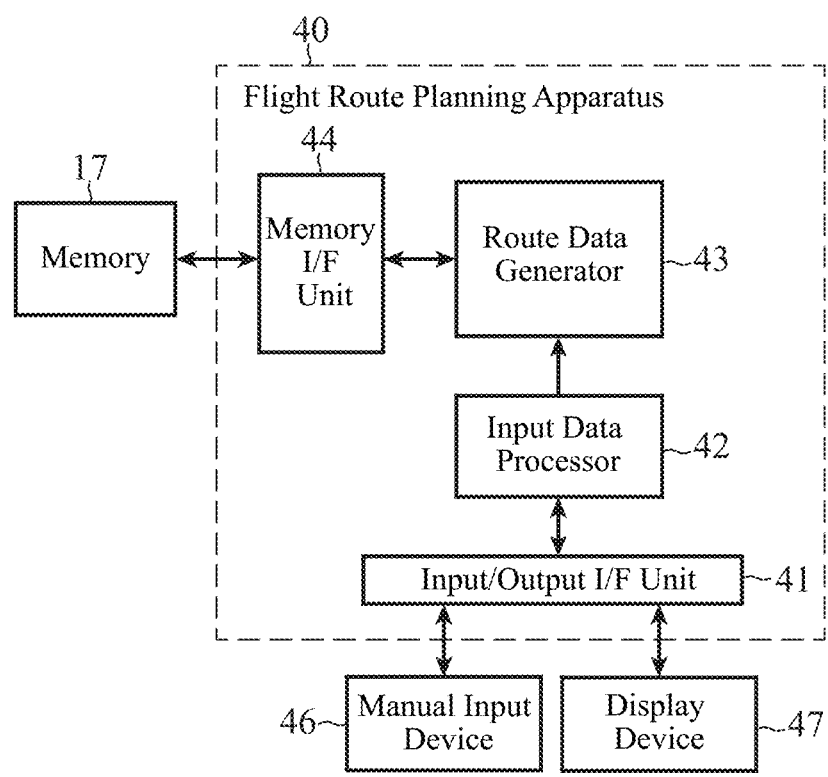
FIG. 3 is a block diagram illustrating a schematic configuration of a flight route planning apparatus of the first embodiment.

Next, a configuration of the flight route planning apparatus 40 will be described. FIG. 3 is a block diagram illustrating a schematic configuration of the flight route planning apparatus 40 of the first embodiment of the present invention.

As illustrated in FIG. 3, the flight route planning apparatus 40 includes an input/output interface unit (input/output I/F unit) 41, an input data processor 42, a route data generator 43, a memory interface unit (memory I/F unit) 44. The input/output I/F unit 41 is connected to a manual input device 46 and a display device 47. In the memory I/F unit 44, the memory 17 which is a portable recording medium is mounted in a freely attachable and detachable manner.

The manual input device 46 detects a manual input provided by a user and outputs the detected manual input to the input/output I/F unit 41. The manual input device 46 is an input device that has input buttons or input keys for receiving a manual input provided by a user. For example, a keyboard or a pointing device such as a mouse device or a touch panel can be used as the manual input device 46. The input/output I/F unit 41 is capable of supplying the manual input to the input data processor 42 as setting data for instructing a flight route of the airplane 2 or the data acquisition cycle described above. Furthermore, the input data processor 42 may display a setting screen on the display device 47. A user can manipulate the manual input device 46 to provide an input while viewing the setting screen. The display device 47 can be configured using an image display device such as a liquid crystal display panel or organic EL display panel, for example.

Upon receipt of setting data instructing a flight route or a data acquisition cycle, the input data processor 42 interprets the setting data and outputs the interpretation result to the route data generator 43. On the basis of the interpretation result, the route data generator 43 generates route data that defines a flight route of the airplane 2 or generates cycle data that defines the data acquisition cycle. The memory I/F unit 44 stores the route data or the cycle data in the memory 17. After the route data or the cycle data is stored in the memory 17, the user can detach the memory 17 from the flight route planning apparatus 40 and attach the memory 17 to the airplane 2.

A hardware configuration of the flight route planning apparatus 40 can be implemented by a computer incorporating a central processing unit (CPU) such as a workstation or a mainframe. Alternatively, the hardware configuration of the flight route planning apparatus 40 may be implemented by a large scale integrated circuit (LSI) such as a digital signal processor (DSP), an application specific integrated circuit (ASIC), an field-programmable gate array (FPGA), or a combination thereof.

Figure 4A:
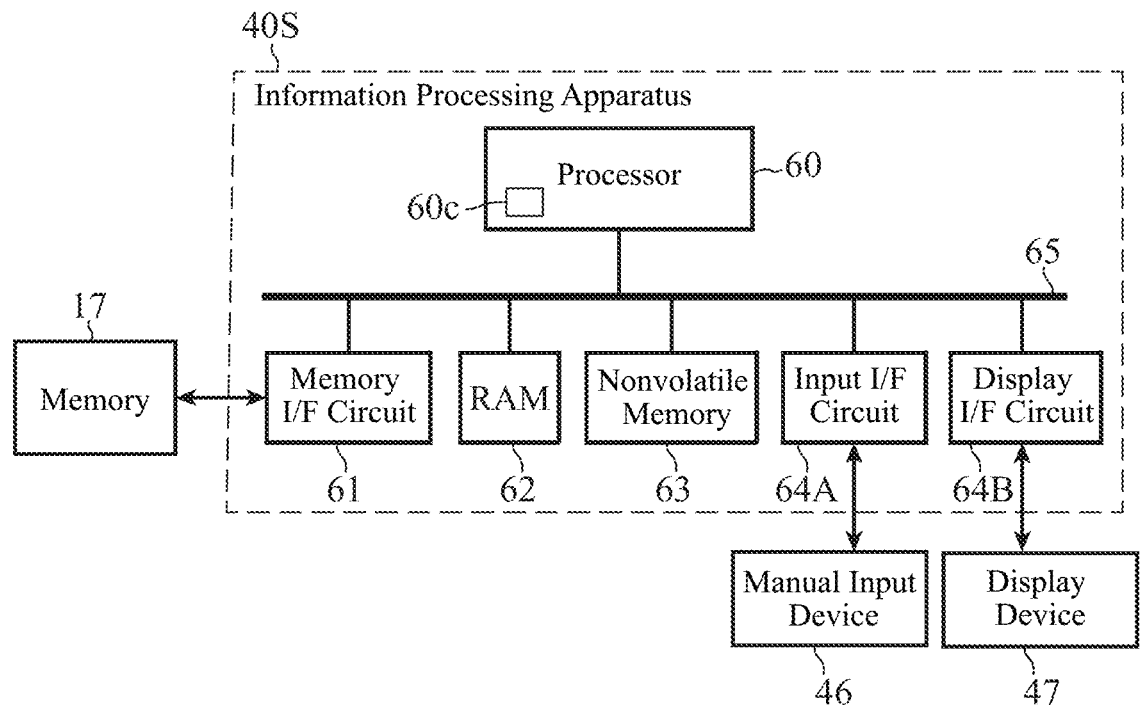
FIG. 4A and FIG. 4B are block diagrams each schematically illustrating an example of a hardware configuration of the flight route planning apparatus of the first embodiment.

FIG. 4A is a block diagram illustrating a schematic configuration of an information processing apparatus 40S as a hardware configuration example of the flight route planning apparatus 40. As illustrated in FIG. 4A, the information processing apparatus 40S includes a processor 60 including a CPU 60c, a memory interface circuit (memory I/F circuit) 61, a random access memory (RAM) 62 used as a working memory of the processor 60, a nonvolatile memory 63 in which computer programs of one or both of software and firmware are stored, an input interface circuit (input I/F circuit) 64A connected to the manual input device 46, and a display interface circuit (display I/F circuit) 64B connected to the display device 47. The components 60 to 63, 64A, and 64B of the information processing apparatus 40S are mutually connected via a signal path 65 such as a bus circuit. The memory I/F circuit 61 implements the function of the memory I/F unit 44 in FIG. 3, and the input I/F circuit 64A and the display I/F circuit 64B implement the function of the input/output I/F unit 41 of FIG. 3.

The processor 60 is capable of implementing the functions of the input data processor 42 and the route data generator 43 in FIG. 3 by reading out and executing a computer program which is software, firmware, or a combination thereof from the nonvolatile memory 63. As the nonvolatile memory 63, for example, a read only memory (ROM), a flash memory, an erasable programmable rom (EPROM), an electrically EPROM (EEPROM), a magnetic disk, or an optical disk can be used, although no limitation thereto is intended.

Figure 4B:
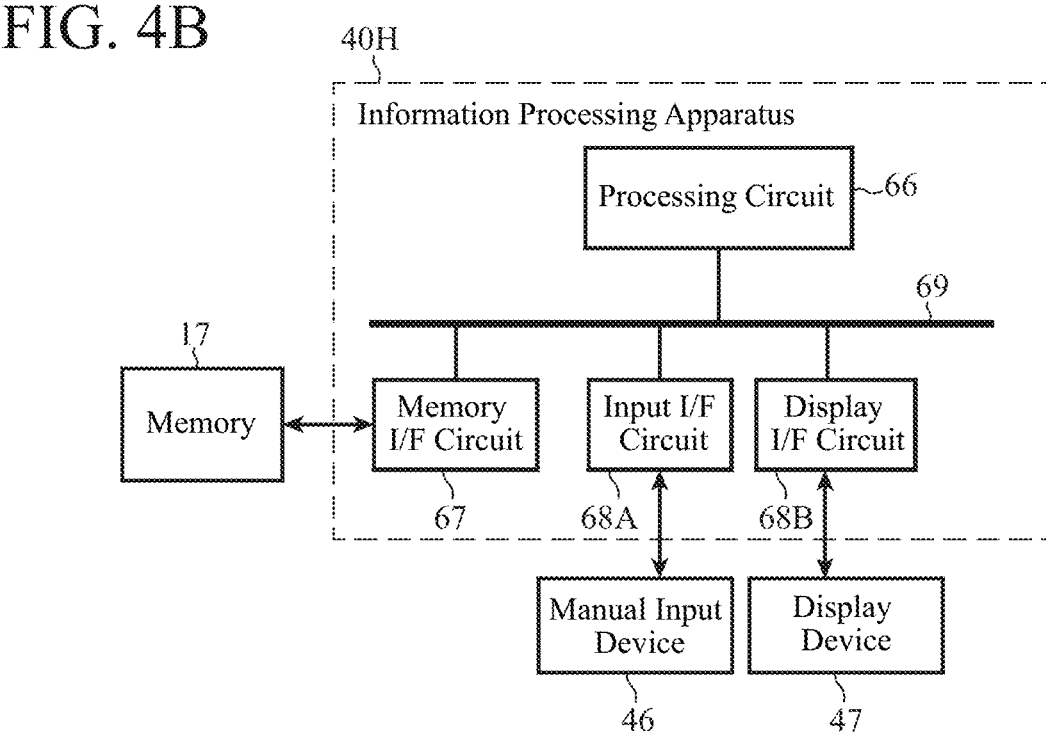

FIG. 4B is a block diagram illustrating a schematic configuration of an information processing apparatus 40H as another hardware configuration example of the flight route planning apparatus 40. As illustrated in FIG. 4B, the information processing apparatus 40H includes a processing circuit 66 of dedicated hardware such as a DSP, an ASIC, or an FPGA, a memory interface circuit (memory I/F circuit) 67, an input interface circuit (input I/F circuit) 68A connected to the manual input device 46, and a display interface circuit (display I/F circuit) 68B connected to the display device 47. The components 66, 67, 68A, and 68B of the information processing apparatus 40H are mutually connected via a signal path 69 such as a bus circuit. The memory I/F circuit 67 implements the function of the memory I/F unit 44 in FIG. 3, and the input I/F circuit 68A and the display I/F circuit 68B implements the function of the input/output I/F unit 41 which FIG. 3. The processing circuit 66 implements the functions of the input data processor 42 and the route data generator 43.

Figures 5, 6:
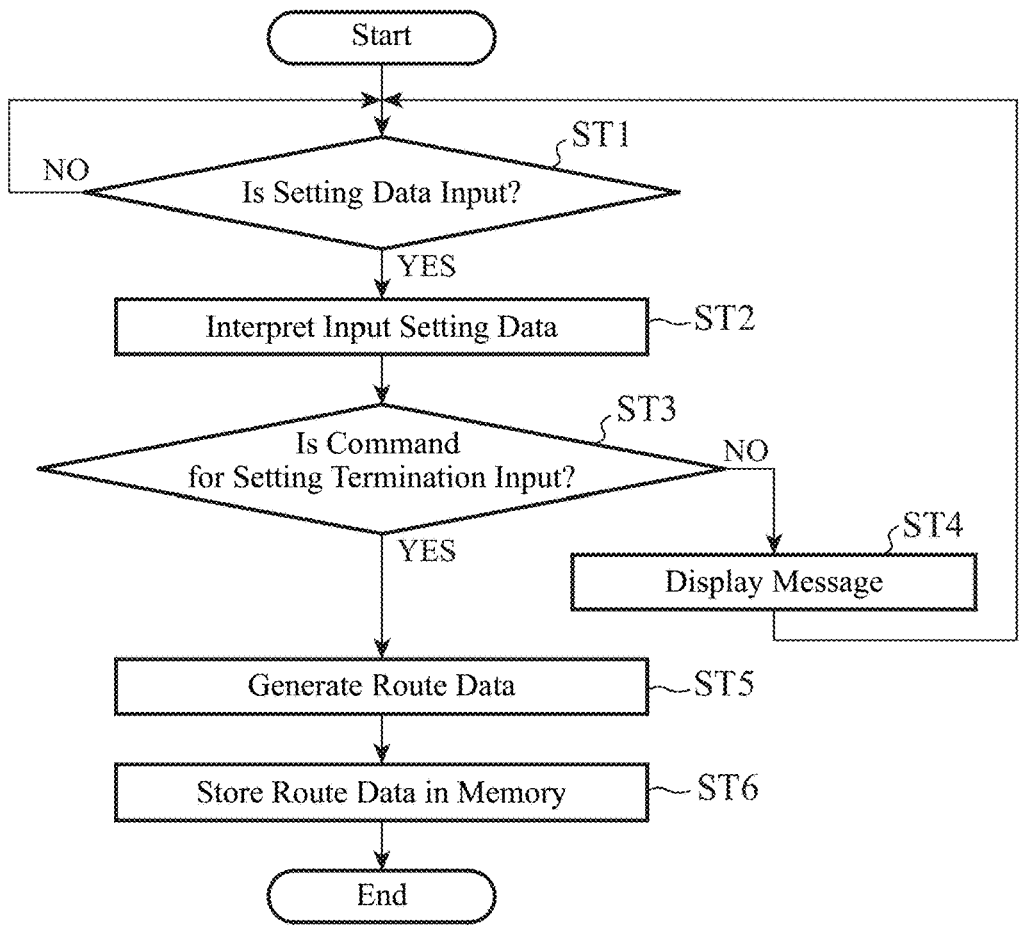
FIG. 5 is a flowchart illustrating an exemplary procedure of flight route setting processing according to the first embodiment.
FIG. 6 is a table illustrating an example of route data according to the first embodiment in a tabular format.

Next, with reference to FIG. 5, an operation example of the flight route planning apparatus 40 will be described below. FIG. 5 is a flowchart schematically illustrating an exemplary procedure of flight route setting processing according to the first embodiment.

Referring to FIG. 5, the input data processor 42 waits for setting data to be input from the manual input device 46 via the input/output I/F unit 41 (NO in step ST1). When the setting data is input (YES in step ST1), the input data processor 42 interprets the input setting data (step ST2). A result of the interpretation is supplied to the route data generator 43. A user can provide an input of a setting command in accordance with a predetermined format, as the setting data. When interpreting that a command for setting termination has not been input (NO in step ST3), the input data processor 42 causes the display device 47 to display a message that prompts a further input, such as the message "please enter the next setting data" (step ST4). Thereafter, the input data processor 42 executes step ST1.

For example, when a user instructs the pass-through of a location specified by a latitude of "35 degrees, 21 minutes and 14.572 seconds" and a longitude of "139 degrees, 31 minutes and 52.676 seconds" at a time of "21:56:30" on a date of "Dec. 24, 2015", the user can input a passage command of the following example 1 as a setting command (except double quotation marks). Notation of the latitude and longitude is based on the WGS-84 coordinate system.

Example 1: "35.354048, 139.531299, 2015/12/24/21:56:30"

Alternatively, when user instructs the hovering for "ten seconds" at a location specified by a latitude of "35 degrees, 21 minutes and 14.572 seconds" and a longitude of "139 degrees, 31 minutes and 52.676 seconds" at a time of "21:56:30" on a date of "Dec. 24, 2015", the user can input a hovering command of the following example 2 as the setting command (except double quotation marks).

Example 2: "35.354048, 139.531299, 2015/12/24/21:56:30 10 sec Hov"

In addition, when a user sets a data acquisition cycle (acquisition interval) of the right-side camera image to one second, the user can input a data acquisition interval setting command (except double quotation marks) of the following example 3.

Example 3: "Set RightCamera Interval 1 sec"

Then, the user can input a command for setting termination of the following example 4 (except double quotation marks).

Example 4: "END"

When the input data processor 42 interprets that a command for setting termination is input (YES in step ST3), the route data generator 43 generates route data on the basis of an input setting command other than the command for setting termination (step ST5), and stores the route data in the memory 17 via the memory I/F unit 44 (step ST6). In addition, when a command for the setting of a data acquisition interval is input, cycle data is generated in step ST5, and the cycle data is stored in the memory 17 in step ST6. Then, the flight route setting processing terminates.

Figure 7:
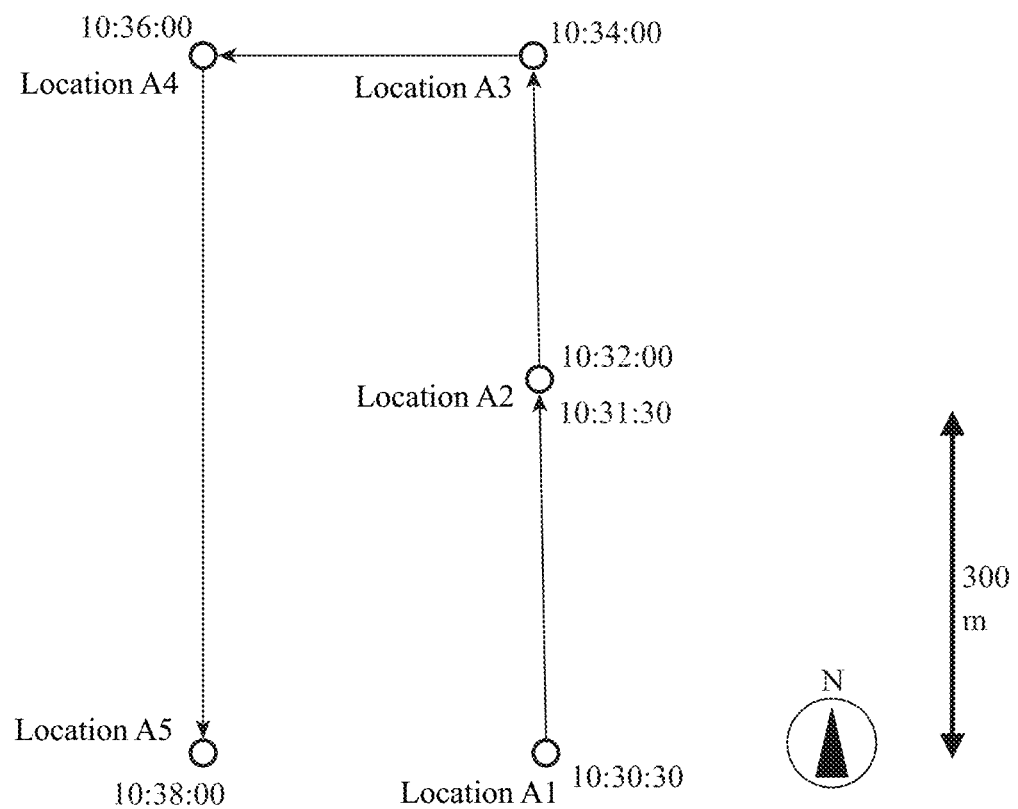
FIG. 7 is a diagram for explaining a flight route defined by route data.

FIG. 6 is a table illustrating an example of contents of route data in a tabular format. As illustrated in FIG. 6, route data is a set of records, each including "location ID (location identifier)", "latitude", "longitude", "date" and "time." FIG. 7 is a diagram for explaining a flight route from a location A1 to a location A5 illustrated in the table of FIG. 6. In the example of FIG. 7, the airplane 2 departs from a point above the location A1 at 10:30:30 on Month yy and Date zz, 2016. Then, the airplane 2 arrives a point above the location A2 at 10:31:30 and hovers only for 30 seconds from 10:31:30 to 10:32:00. Next, the airplane 2 departs from a point above the location A2 at 10:32:00. Then, the airplane 2 passes over the location A3 and turns at 10:34:00 and flies toward the point above the location A4. The airplane 2 passes over the location A4 and turns at 10:36:00 and flies toward the point above the location A5. Then, the airplane 2 arrives a point above the location A5 at 10:38:00. Each of the locations A1 to A5 is specified by a "latitude" and a "longitude."

The route data generator 43 automatically calculates the flight speed of the airplane 2 in each of sections between the locations on the basis of the designated flight route. The route data generator 43 can store data designating the flight speed in each of the sections in the memory 17 as a part of the route data.

Note that, in the example of FIG. 7, a flight path of the airplane 2 is a linear route, although no limitation thereto is intended. For example, the route data generator 43 may calculate a curved path connecting a plurality of locations by polynomial approximation. Since a sudden turn of the airplane 2 can be prevented by setting a curved route, this can reduce a load on the attitude control of the airplane 2.

Figure 8:
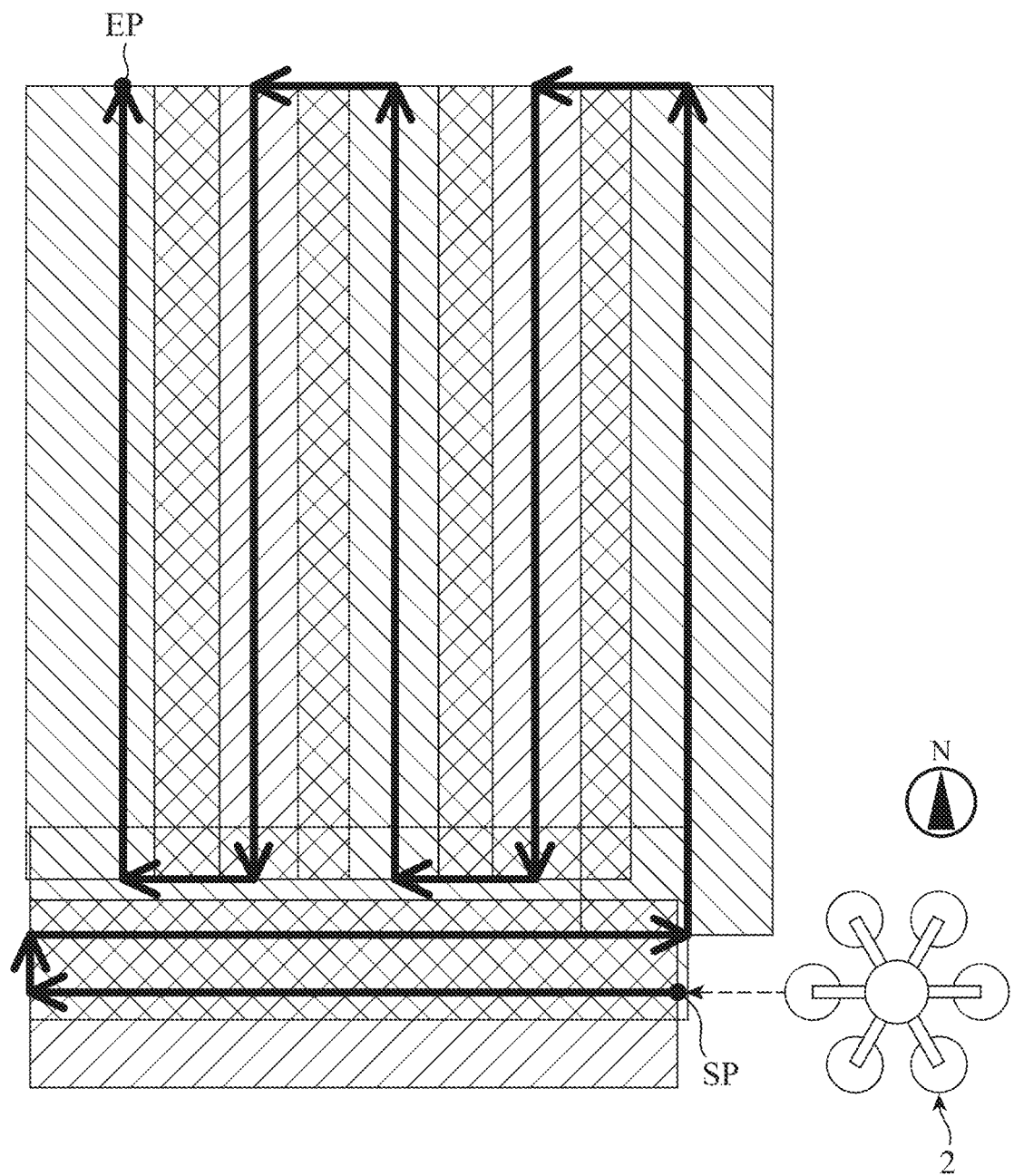
FIG. 8 is a diagram for explaining another example of a flight route.

Furthermore, when a user inputs coordinate data indicating a plurality of locations and measurement start time, the route data generator 43 can automatically generate route data on the basis of the coordinate data and the measurement start time. In this case, it is preferable that the route data generator 43 generates the route data such that measurement is completed in the shortest time and that high measurement accuracy is implemented. FIG. 8 is a diagram schematically illustrates an example of a flight route defined by route data that is automatically generated. This route data is automatically generated when coordinate data indicating four locations of a measurement start location SP at a lower right in the drawing, a passing location at a lower left in the drawing, a passing location at an upper right in the drawing, and a measurement end location EP at an upper left in the drawing and measurement start time are input.

In the example of FIG. 8, a flight route is indicated by a bold line with an arrow. As illustrated in FIG. 8, the airplane 2 flies along a first flight route between the measurement start location SP and the passing location on the left side (west side) in the drawing along a uniaxial direction from the east side to the west side, and then flies along a second flight route which is parallel to and adjacent to the first flight route on the north side, from the west side to the east side along a uniaxial direction. Here, scanning ranges of the ranging laser light when the airplane 2 flies along the first flight route and the second flight route are indicated by hatching of patterns different from each other. As illustrated in FIG. 8, the scanning range of the ranging laser light when the airplane 2 flies along the first flight route and the scanning range of the ranging laser light when the airplane 2 flies along the first flight route overlap with each other. This allows the laser ranging device 13 to generate ranging data with high measurement accuracy.

As illustrated in FIG. 8, the airplane 2 further flies along a third flight route between the passing location near the measurement start location SP and the passage location on the upper side (north side) in the drawing along a uniaxial direction from the south side to the north side, and then flies along a fourth flight route which is parallel to and adjacent to the third flight route on the west side, from the north side to the south side along a uniaxial direction. Thereafter, the airplane 2 flies along a fifth flight route which is parallel to and adjacent to the fourth flight route on the west side, from the south side to the north side along a uniaxial direction, and then flies along a sixth flight route which is parallel to and adjacent to the fifth flight route on the west side, from the north side to the south side along a uniaxial direction. Then, the airplane 2 flies along a seventh flight route which is parallel to and adjacent to the sixth flight route from the west side along a uniaxial direction from the south side to the north side to the measurement end location EP. At this time, scanning ranges of the ranging laser light when the airplane 2 flies along the third and fourth flight routes overlap with each other. Scanning ranges of the ranging laser light when the airplane 2 flies along the fourth and fifth flight routes overlap with each other, and scanning ranges of the ranging laser light when the airplane 2 flies along the fifth and sixth flight routes overlap with each other.

In this manner, the route data generator 43 generates route data such that scanning ranges of the ranging laser light corresponding to flight routes adjacent to each other overlap with each other, and thus the laser ranging device 13 can measure a distance L to each of range-measurement points in the overlapping scanning ranges and an angular direction θ for a plurality of times. As a result, the laser ranging device 13 can generate ranging data with small errors, for example by averaging the measurement results on the basis of the measurement results. In addition, since scanning ranges overlapping in the east-west direction and scanning ranges overlapping in the north-south direction are generated as illustrated in FIG. 8, it is possible to generate ranging data with a small error in the east-west direction, and it is also possible to further generate ranging data with a small error in the north-south direction. In particular, for range-measurement points within scanning ranges overlapping in both the east-west direction and the north-south direction, it is possible to generate ranging data having small errors in both the east-west direction and the north-south direction.

Figure 9:
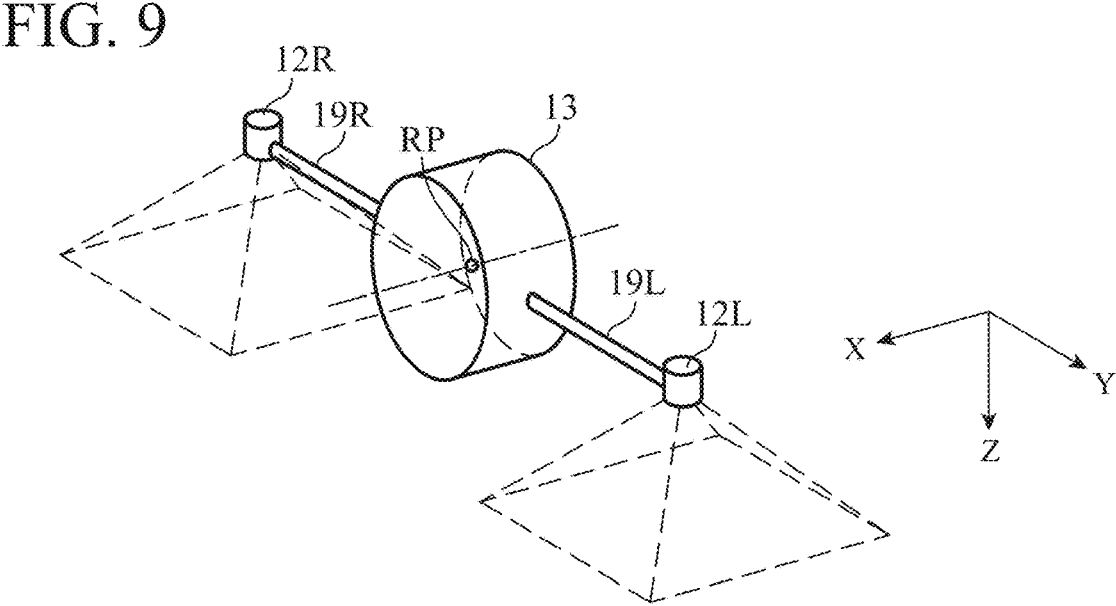
FIG. 9 is a perspective view of a configuration example of a laser ranging device, a right-side camera, and a left-side camera in an observation apparatus of the first embodiment.

Next, the configuration of the observation apparatus 10 illustrated in FIG. 1 will be described. FIG. 9 is a perspective view schematically illustrating a configuration example of a unit including the laser ranging device 13 and the imaging unit 11 of the observation apparatus 10.

As illustrated in FIG. 9, the laser ranging device 13 has an emission reference point RP and emits laser light toward a ground surface vertically below (positive direction in a Z axis). The laser ranging device 13 of the present embodiment is capable of causing the laser light to scan in a Y axis direction perpendicular to both a traveling direction (that is, an X axis direction) and the Z axis direction of the airplane 2. The right-side camera 12R and the left-side camera 12L are arranged at positions geometrically symmetrical to each other with respect to the emission reference point RP and are arranged so as to be able to capture the ground surface vertically below. The right-side camera 12R is connected to one end of an arm 19R extending in the negative direction of the Y axis from the laser ranging device 13, and the left-side camera 12L is connected to one end of an arm 19L extending in the positive direction of the Y axis from the laser ranging device 13. For example, the right-side camera 12R can be arranged at a position one meter away from the emission reference point RP of the laser ranging device 13 in the negative direction of the Y axis and that the left-side camera 12L is arranged at a position one meter away from the emission reference point RP in the positive direction of the Y axis.

Figure 10A:
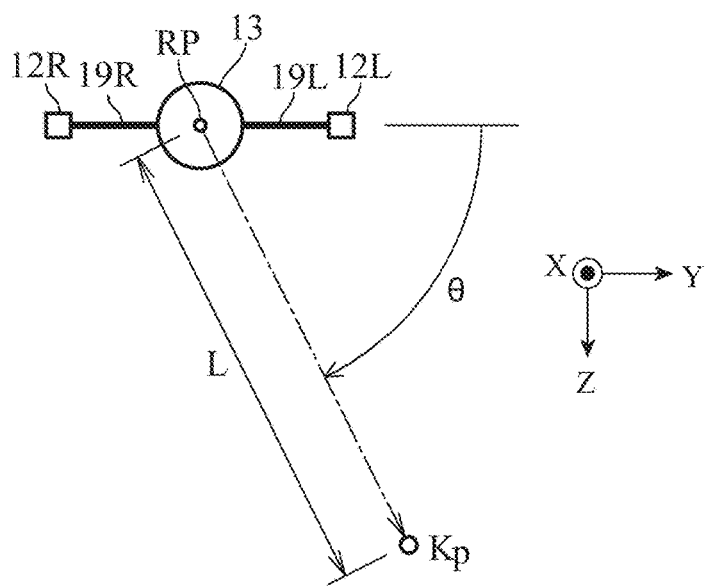
FIG. 10A is a front view of the observation apparatus illustrated in FIG. 9.
Figure 10B:
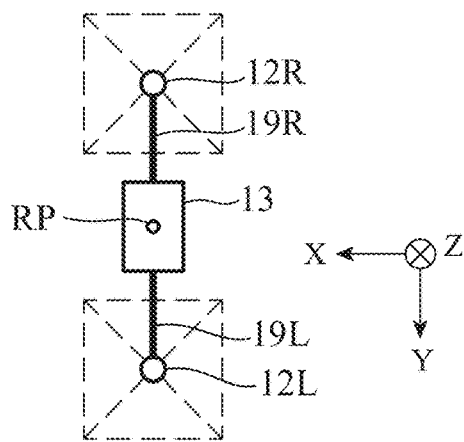
FIG. 10B is a top view of the observation apparatus illustrated in FIG. 9.
Figure 10C:
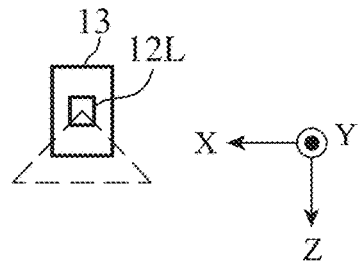
FIG. 10C is a right side view of the observation apparatus illustrated in FIG. 9.

FIG. 10A is a schematic configuration diagram of the unit including the laser ranging device 13 and the imaging unit 11 when viewed from the positive direction of the X axis, FIG. 10B is a schematic configuration diagram of the unit when viewed from the negative direction of the Z axis, and FIG. 10C is a schematic configuration diagram of the unit when viewed from the positive direction of the Y axis. The laser ranging device 13 illustrated in FIG. 10A emits laser light to a range-measurement point $K_p$ on the ground and receives reflected laser light from the range-measurement point $K_p$. The laser ranging device 13 is capable of measuring a distance L between the emission reference point RP and the range-measurement point $K_p$ and measuring, as a radiation emission angle θ, an angle formed by a line segment between the emission reference point RP and the range-measurement point $K_p$ and the positive direction of the Y axis. The laser ranging device 13 is capable of scanning the ground with the laser light while changing the radiation emission angle θ around the emission reference point RP by every 18 degrees in the clockwise direction when viewed from the positive direction of the X axis. In this regard, the radiation emission angle θ is 90 degrees when the laser light is emitted vertically downward (positive direction of the Y axis) from the emission reference point RP.

In the present embodiment, it is assumed that the position of the airplane 2 is the same as the position of the emission reference point RP. Therefore, when the airplane 2 flies in the positive direction of the X axis, the laser ranging device 13, the right-side camera 12R, and the left-side camera 12L also fly in the positive direction of the X axis. FIG. 11 is a table illustrating an example of position coordinates ($X_o$, $Y_o$, $Z_o$) of the emission reference point RP of the laser ranging device 13 while the airplane 2 is flying in a tabular format. The table of FIG. 11 illustrates positions when the airplane 2 is flying for three seconds at a constant speed along the positive direction of the X axis. In the table of FIG. 11, coordinate values of respective position coordinates ($X_o$, $Y_o$, $Z_o$) of the emission reference point RP at times of t=0, 1, 2, and 3 (unit: second) are illustrated. Note that position coordinates ($X_o$, $Y_o$, $Z_o$) are positioning coordinates to be calculated on the basis of a positioning result of the GNSS positioning device 14, and the coordinate values $X_o$, $Y_o$, $Z_o$ illustrated in the table of FIG. 11 are based on position coordinates at a time of t=0 for the convenience of description (unit: meter).

Figures 13A, 13B, 13C:
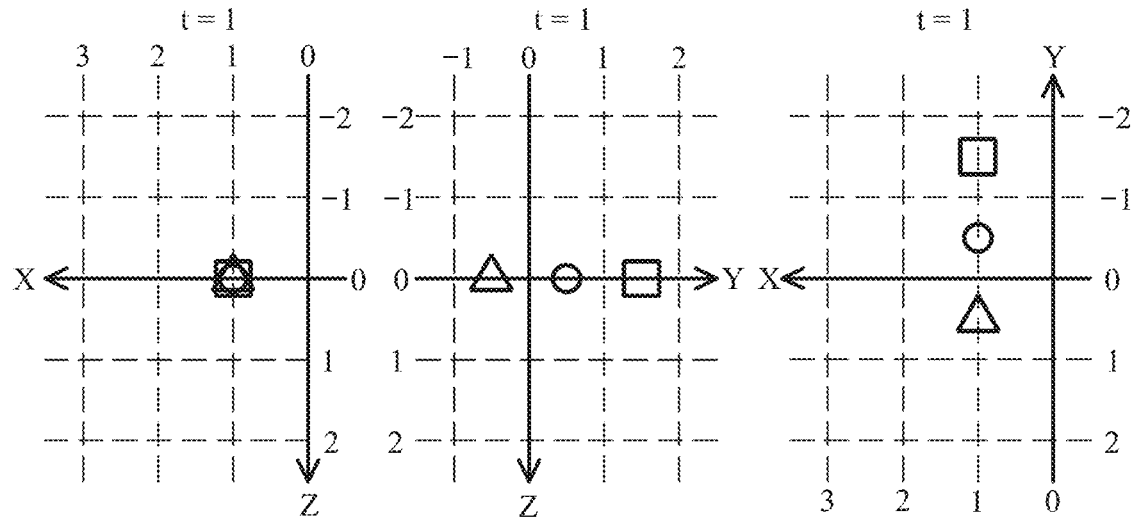
FIGS. 13A to 13C are graphs illustrating position coordinates of the laser ranging device, the right-side camera, and the left-side camera at a time of t=1.
Figures 14A, 14B, 14C:
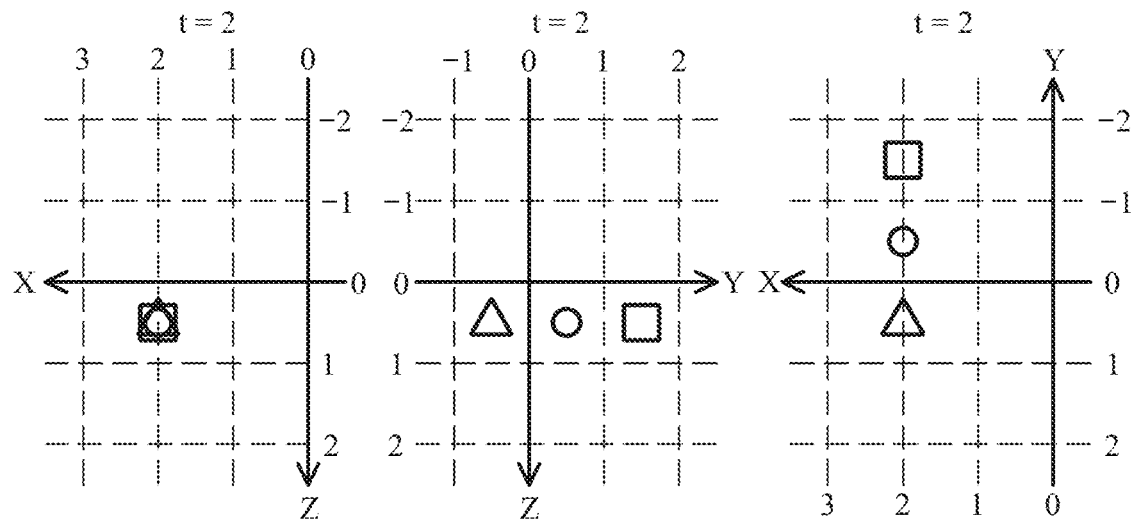
FIGS. 14A to 14C are graphs illustrating position coordinates of the laser ranging device, the right-side camera, and the left-side camera at a time of t=2.
Figures 15A, 15B, 15C:
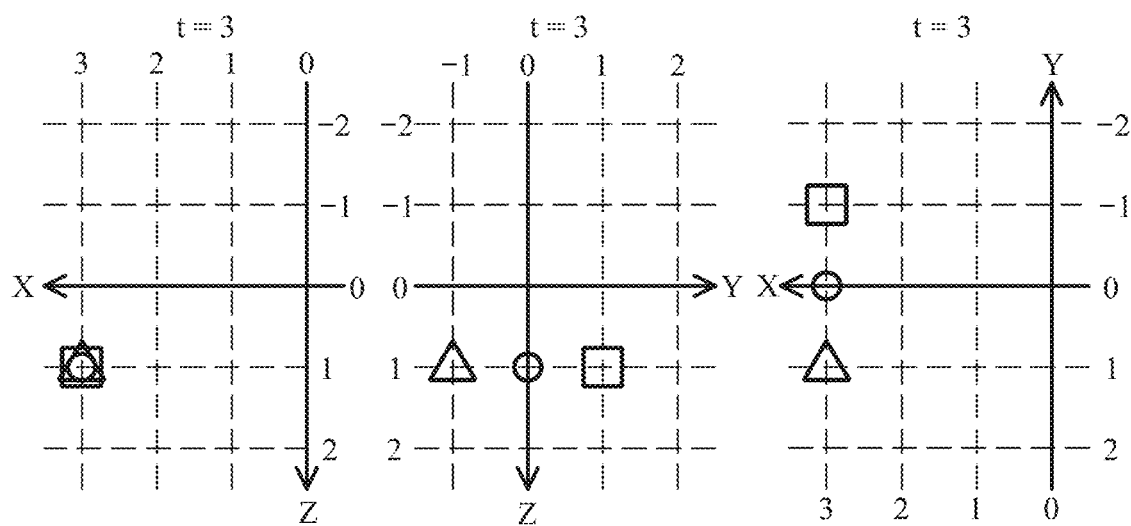
FIGS. 15A to 15C are graphs illustrating position coordinates of the laser ranging device, the right-side camera, and the left-side camera at a time of t=3.

FIGS. 12A, 12B, and 12C are graphs illustrating respective positions of the right-side camera 12R, the left-side camera 12L, and the laser ranging device 13 corresponding to the position coordinates of the emission reference point RP at a time of t=0 as illustrated in FIG. 11. Furthermore, FIGS. 13A, 13B, and 13C are graphs illustrating respective positions of the right-side camera 12R, the left-side camera 12L, and the laser ranging device 13 corresponding to the position coordinates of the emission reference point RP at a time of t=1 as illustrated in FIG. 11. FIGS. 14A, 14B, and 14C are graphs illustrating respective positions of the right-side camera 12R, the left-side camera 12L, and the laser ranging device 13 corresponding to the position coordinates of the emission reference point RP at a time of t=2 as illustrated in FIG. 11. FIGS. 15A, 15B, and 15C are graphs illustrating respective positions of the right-side camera 12R, the left-side camera 12L, and the laser ranging device 13 corresponding to the position coordinates of the emission reference point RP at a time of t=2 as illustrated in FIG. 11. FIGS. 12A, 13A, 14A, and 15A are graphs illustrating position coordinates on the X-Z plane, FIGS. 12B, 13B, 14B, and 15B are graphs illustrating position coordinates on the Y-Z plane, and FIGS. 12C, 13C, 14C, and 15C are graphs illustrating position coordinates on the X-Y plane. Here, the position of the right-side camera 12R corresponds to the position of the center of projection by the right-side camera 12R, which is indicated by a triangular symbol. The position of the left-side camera 12L corresponds to the position of the center of projection by the left-side camera 12L, which is indicated by a square symbol. The position of the laser ranging device 13 corresponds to the position of the emission reference point RP, which is indicated by a round symbol.

At a time of t=0, as illustrated in FIGS. 12A to 12C, the right-side camera 12R, the laser ranging device 13, and the left-side camera 12L are arranged along the Y axis direction. At the time t=1, as illustrated in FIGS. 13A to 13C, the right-side camera 12R, the laser ranging device 13, and the left-side camera 12L have travelled by one meter in the positive direction of the X axis and have shifted in the positive direction of the Y axis by 0.5 meters. At the time t=2, as illustrated in FIGS. 14A to 14C, the right-side camera 12R, the laser ranging device 13, and the left-side camera 12L have further travelled by one meter in the positive direction of the X axis and have shifted in the negative direction of the Z axis by 0.5 meters. Then at a time of t=3 as illustrated in FIGS. 15A to 15C, the right-side camera 12R, the laser ranging device 13, and the left-side camera 12L have further travelled by one meter in the positive direction of the X axis and have shifted in the negative direction of the Y axis by 0.5 meters and in the negative direction of the Z axis by 0.5 meters. Therefore, the position in the Z axis direction at a time of t=3 has returned to the position in the Z axis direction at a time of t=0.

In an actual flight environment, even when horizontal flight along the X-Y plane is intended, it is difficult for the airplane 2 to fly horizontally, due to the influence of external factors such as wind. For example, the airplane 2 may fly while inclined in each of a rolling direction around the X axis, a pitching direction around the Y axis, and a yawing direction around the Z axis.

Figures 16A, 16B:
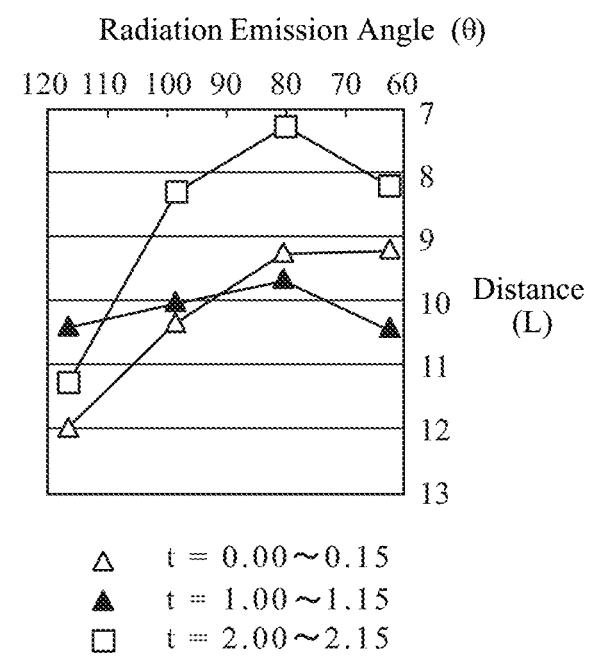
FIG. 16A is a graph illustrating numerical examples of radiation emission angles and measurement distances obtained by the laser ranging device in a tabular format.
FIG. 16B is a graph illustrating a relationship between the radiation emission angle and the measurement distance illustrated in FIG. 16A.

Next, FIGS. 16A and 16B are a table and a graph illustrating an example of measurement results (distance L and radiation emission angle θ) of the laser ranging device 13 while the airplane 2 is flying. FIG. 16A is a table illustrating changes in the measurement results of the laser ranging device 13 in a period of time t=0.00 to 2.15 (unit: second) in a tabular format, and FIG. 16B is a graph illustrating changes in the measurement results of the laser ranging device 13 in a period of time t=0.00 to 2.15. In FIG. 16B, a white triangular symbol indicates the distance L and the radiation emission angle θ measured at the time t=0.00 to 0.15, a black triangular symbol indicates the distance L and the radiation emission angle θ measured at the time t=1.00 to 1.15, and a white rectangular symbol indicates the distance L and the radiation emission angle θ measured at the time t=2.00 to 2.15.

As illustrated in FIG. 16A, a measurement result of the laser ranging device 13 is stored in the memory 17 for each measurement as a combination of time t when the measurement has been performed, the radiation emission angle θ, and the distance L as one record. In the example of FIG. 16A, four times of measurement are performed in a second.

Figure 17:
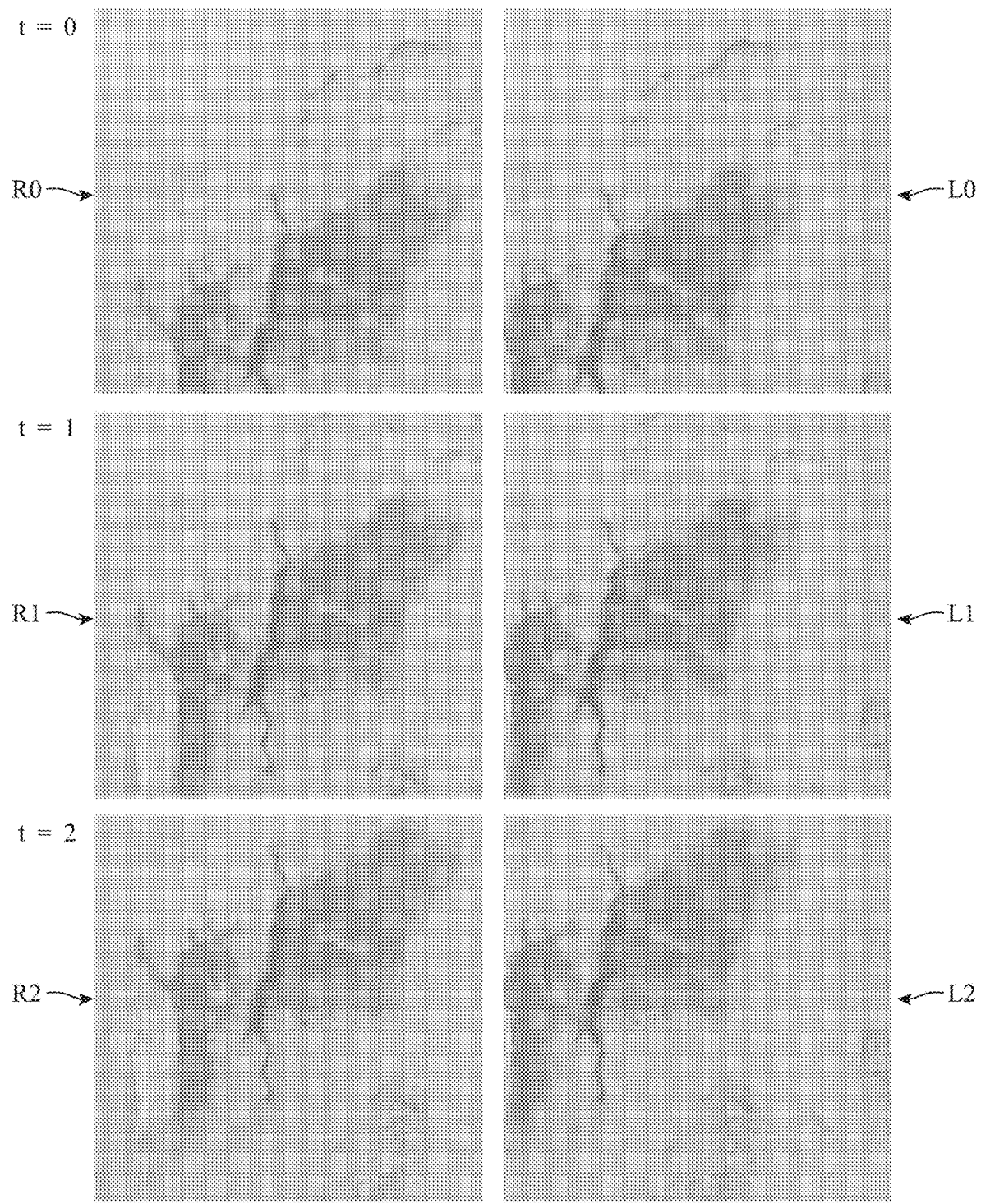
FIG. 17 is a diagram illustrating examples of right-side camera images and left-side camera images at times of t=0, 1, and 2.

Each of the right-side camera 12R and the left-side camera 12L is capable of capturing, for example, a rectangular area on the ground vertically below for every one second as an imaging range. FIG. 17 is a diagram illustrating an example of captured images at times of t=0, 1, and 2 (unit: second). At a time of t=0, a right-side camera image R0 and a left-side camera image L0 are captured, a right-side camera image R1 and a left-side camera image L1 are captured at a time of t=1, and a right-side camera image R2 and a left-side camera image L2 is captured at a time of t=2. Such captured images is stored in the memory 17.

Figure 18:
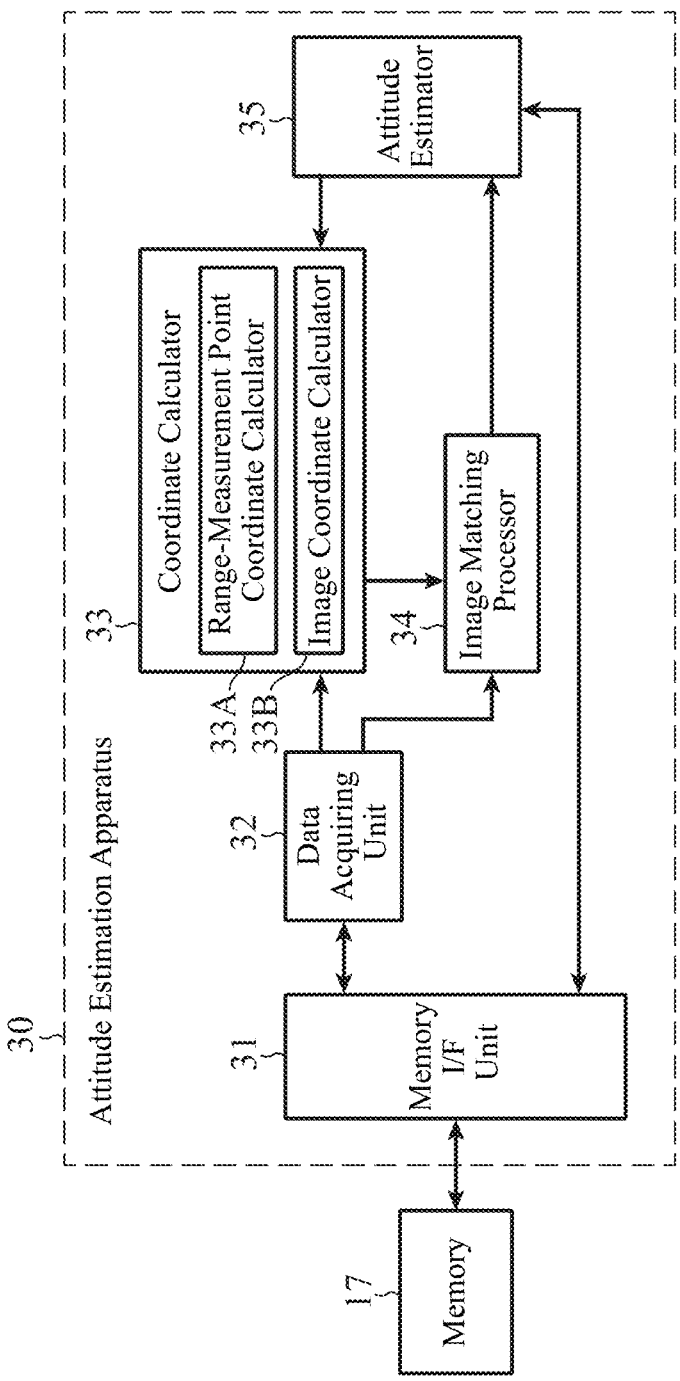
FIG. 18 is a block diagram illustrating a schematic configuration of an attitude estimation apparatus of the first embodiment.

Next, a configuration of the attitude estimation apparatus 30 illustrated in FIG. 1 will be described. FIG. 18 is a block diagram illustrating a schematic configuration of the attitude estimation apparatus 30 of the first embodiment in accordance with the present invention.

As illustrated in FIG. 18, the attitude estimation apparatus 30 includes a memory interface unit (memory I/F unit) 31, a data acquiring unit 32, a coordinate calculator 33, an image matching processor 34, and an attitude estimator 35. The coordinate calculator 33 includes a range-measurement point coordinate calculator 33A and an image coordinate calculator 33B. In the memory I/F unit 31, the memory 17, which is a portable recording medium, is mounted in a freely attachable and detachable manner.

The data acquiring unit 32 acquires the observation data including the positioning data, the ranging data, the actual attitude data, and the captured images from the memory 17 via the memory I/F unit 31. In the present embodiment, the attitude estimation apparatus 30 is not directly connected to the observation apparatus 10. Therefore, in order for the data acquiring unit 32 to acquire the observation data, it is necessary for a user to remove the memory 17 from the airplane 2 and to mount the removed memory 17 to the attitude estimation apparatus 30. An attitude estimation apparatus 30A of a second embodiment as described later is capable of acquiring observation data from an observation apparatus 10A by wireless communication.

The range-measurement point coordinate calculator 33A is capable of calculating position coordinates of one or more range-measurement points (hereinafter also referred to as "geodetic coordinates") in a geodetic coordinate system such as the WGS-84 coordinate system, by using the positioning data, ranging data, and actual attitude data of the observation data and further estimated values of one or more unknown parameters representing the attitude of the airplane 2. Let us denote a three-dimensional vector of geodetic coordinates of a p-th range-measurement point by $Q^{(p)}=[X_G, Y_G, Z_G]^T$. Here, the superscript T is a symbol representing transposition of the matrix. The range-measurement point coordinate calculator 33A can calculate the geodetic coordinates $Q^{(p)}$ of the p-th range-measurement point from the following mathematical expression (1), for example.

$$Q^{(p)} = \begin{bmatrix} X_G \\ Y_G \\ Z_G \end{bmatrix} = M(\kappa)M(\varphi)M(\omega)D + \begin{bmatrix} X_O \\ Y_O \\ Z_O \end{bmatrix} \quad (1)$$

Here, $[X_O, Y_O, Z_O]^T$ represents a three-dimensional position vector indicating position coordinates of the emission reference point RP calculated on the basis of positioning data. In addition, D represents a relative position vector of a range-measurement point calculated on the basis of ranging data with the emission reference point RP serving as a reference. In other words, the relative position vector D represents position coordinates of a range-measurement point having the emission reference point RP as the origin. The range-measurement point coordinate calculator 33A can calculate the relative position vector D from the following mathematical expression (2), for example.

$$D = [0, L\cos\theta, L\sin\theta]^T \quad (2)$$

Meanwhile, in mathematical expression (1), $M(\omega)$ represents a rotation matrix that rotates the three-dimensional coordinates around the X axis direction by a rotation angle $\omega$, $M(\varphi)$ represents a rotation matrix that rotates the three-dimensional coordinates around the Y axis direction by a rotation angle $\varphi$, and $M(\kappa)$ represents a rotation matrix that rotates the three-dimensional coordinates around the Z axis direction by a rotation angle $\kappa$. These rotation matrices $M(\omega)$, $M(\ )$, and $M(\kappa)$ are expressed by the following mathematical expressions (3), for example.

$$M(\kappa) = \begin{bmatrix} \cos\kappa & -\sin\kappa & 0 \\ \sin\kappa & \cos\kappa & 0 \\ 0 & 0 & 1 \end{bmatrix}, \quad (3)$$

$$M(\varphi) = \begin{bmatrix} \cos\varphi & 0 & \sin\varphi \\ 0 & 1 & 0 \\ -\sin\varphi & 0 & \cos\varphi \end{bmatrix},$$

$$M(\omega) = \begin{bmatrix} 1 & 0 & 0 \\ 0 & \cos\omega & -\sin\omega \\ 0 & \sin\omega & \cos\omega \end{bmatrix}$$

In a case where there are no rotation angles $\omega$, $\varphi$, and $\kappa$ at a time t for calculating the positioning coordinates $Q^{(P)}$, the range-measurement point coordinate calculator 33A interpolates the rotation angles $\omega$, $\varphi$, and $\kappa$ at a time t between imaging times $t_i$ and $t_j$ using rotation angles $\omega_i$, $\varphi_i$, and $\kappa_i$ at an imaging time of $t=t_i$ and rotation angles $\omega_j$, $\varphi_j$, and $\kappa_j$ at an imaging time of $t=t_j$ ($i \neq j$). For example, the range-measurement point coordinate calculator 33A can interpolate the rotation angles $\omega$, $\varphi$, and $\kappa$ from the following mathematical expressions (3a).

$$\begin{cases} \omega = \omega(t) = (1-r) \times \omega_i + r \times \omega_j \\ \varphi = \varphi(t) = (1-r) \times \varphi_i + r \times \varphi_j \\ \kappa = \kappa(t) = (1-r) \times \kappa_i + r \times \kappa_j \end{cases} \quad (3a)$$

In mathematical expressions (3a), r represents an interpolation coefficient, which is given by the following mathematical expression (3b), for example.

$$r = \frac{t}{\Delta t} - \text{floor}\left(\frac{t}{\Delta t}\right) \quad (3b)$$

Here, $\Delta t$ represents a sampling interval $(=|t_i - t_j|)$, and floor(x) represents a floor function for giving the maximum integer less than or equal to x for a real number x.

The rotation angle $\omega$ corresponds to a roll angle around the X axis direction, the rotation angle $\varphi$ corresponds to a pitch angle around the Y axis, and the rotation angle $\kappa$ corresponds to a yaw angle around the Z axis. When the airplane 2 is inclined, at least one of the three types of attitude angles of a roll angle around the X axis direction, a pitch angle around the Y axis direction, and a yaw angle around the Z axis direction has a value which is not zero. Due to the inclination of the airplane 2, an error occurs in the relative position vector D calculated on the basis of ranging data. The rotation matrices $M(\omega)$, $M(\varphi)$ and $M(\kappa)$ are for correction of errors in the relative position vector D caused by the inclination of the airplane 2.

As described above, the attitude sensor 15 of the present embodiment is capable of detecting a combination of the roll angle and the pitch angle representing the attitude of the airplane 2 as actual attitude data, but does not detect the yaw angle. Therefore, in a case where actual attitude data with certain accuracy is detected, the range-measurement point coordinate calculator 33A can know the rotation angles $\omega$ and $\varphi$ defining the rotation matrices $M(\omega)$ and $M(\varphi)$ from the actual attitude data, however the rotation angle $\kappa$ defining the rotation matrix $M(\kappa)$ is an unknown parameter. In this case, the range-measurement point coordinate calculator 33A sets an initial value of an estimated value of the rotation angle $\kappa$ to 0 degrees. As a result, the range-measurement point coordinate calculator 33A can calculate the geodetic coordinates $Q^{(p)}$ of each range-measurement point from mathematical expression (1).

On the other hand, in a case where the actual attitude data is not detected, or in a case where detection accuracy of actual attitude data is low, all the rotation angles $\omega$, $\varphi$, and $\kappa$ are unknown parameters. In the case where the actual attitude data is not detected, the range-measurement point coordinate calculator 33A sets initial values of estimated values of all the rotation angles $\omega$, $\varphi$, and $\kappa$ to 0 degrees. Meanwhile in the case where detection accuracy of actual attitude data is low, the range-measurement point coordinate calculator 33A sets initial values of estimated values of the rotation angles $\omega$ and $\varphi$ to values based on the actual attitude data and sets an initial value of an estimated value of the rotation angle $\kappa$ to 0 degrees. As a result, the range-measurement point coordinate calculator 33A can calculate the geodetic coordinates $Q^{(p)}$ of each range-measurement point from mathematical expression (1). As will be described later, correction values for the estimated values of these unknown parameters are calculated in accordance with a nonlinear least squares method.

The image coordinate calculator 33B performs first projection transformation on the geodetic coordinates $Q^{(p)}$ from the geodetic coordinate system to a projection plane coordinate system (image coordinate system) of the right-side camera 12R for each range-measurement point to calculate the coordinates $S_R$ of a first projected point which are two-dimensional image coordinates, and also performs second projection transformation on the geodetic coordinates $Q^{(p)}$ from the geodetic coordinate system to a projection plane coordinate system (image coordinate system) of the left-side camera 12L for each range-measurement point to calculate the coordinates $S_L$ of a second projected point which are two-dimensional image coordinates. Details of the first and second projection transformation will be described later.

The image matching processor 34 executes image matching between two captured images (first captured image and second captured image) selected from captured images and detects image coordinates of a range-measurement point that appears in one of the two captured images.

The attitude estimator 35 calculates correction amounts for the estimated values of the unknown parameters as described above to reduce the absolute difference between the image coordinates detected by the image matching processor 34 and the corresponding coordinates $S_L$ or $S_R$ of a projected point. Here, the attitude estimator 35 is capable of calculating the correction amounts in accordance with the nonlinear least squares method described later. The attitude estimator 35 can correct the estimated values of the unknown parameters using the correction amount.

A hardware configuration of the attitude estimation apparatus 30 can be implemented by a computer incorporating a CPU such as a workstation or a mainframe. Alternatively, the hardware configuration of the attitude estimation apparatus 30 may be implemented by an LSI such as a DSP, an ASIC, an FPGA, or a combination thereof.

Figure 19A:
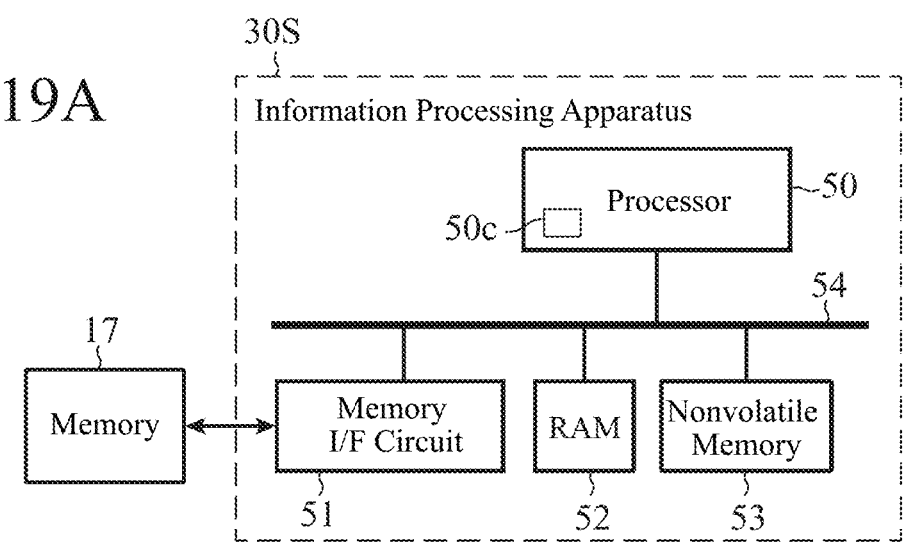
FIGS. 19A and 19B are block diagrams each schematically illustrating an example of a hardware configuration of the attitude estimation apparatus of the first embodiment.

FIG. 19A is a block diagram illustrating a schematic configuration of an information processing apparatus 30S as a hardware configuration example of the attitude estimation apparatus 30. As illustrated in FIG. 19A, the information processing apparatus 30S includes a processor 50 including a CPU 50c, a memory interface circuit (memory I/F circuit) 51, a RAM 52 used as a working memory of the processor 50, and a nonvolatile memory 53 in which computer programs of one or both of software and firmware are stored. The components 50 to 53 of this information processing apparatus 30S are mutually connected via a signal path 54 such as a bus circuit. The memory I/F circuit 51 implements the function of the memory I/F unit 31 in FIG. 18. The processor 50 is capable of implementing the functions of the data acquiring unit 32, the coordinate calculator 33, the image matching processor 34, and the attitude estimator 35 in FIG. 18 by reading out and executing a computer program which is software, firmware, or a combination thereof from the nonvolatile memory 53. As the nonvolatile memory 53, for example, a ROM, a flash memory, an EPROM, an EEPROM, a magnetic disk, or an optical disk can be used, although no limitation thereto is intended.

Figure 19B:
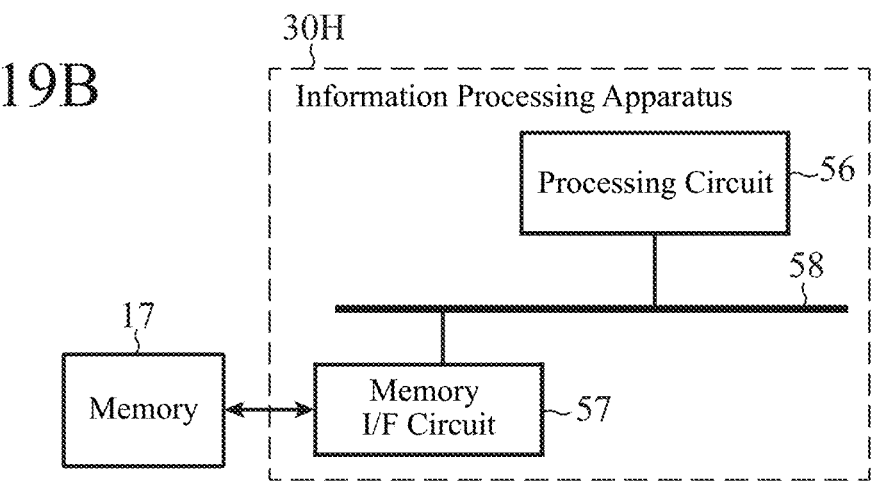

FIG. 19B is a block diagram illustrating a schematic configuration of an information processing apparatus 30H as a hardware configuration example of the attitude estimation apparatus 30. As illustrated in FIG. 19B, the information processing apparatus 30H includes a processing circuit 56 of dedicated hardware such as a DSP, an ASIC, or an FPGA and a memory interface circuit (memory I/F circuit) 57. The processing circuit 56 and the memory I/F circuit 57 are mutually connected via a signal path 58 such as a bus circuit. The memory I/F circuit 57 implements the function of the memory I/F unit 31 in FIG. 18. The processing circuit 56 implements the functions of the data acquiring unit 32, the coordinate calculator 33, the image matching processor 34, and the attitude estimator 35 in FIG. 18.

Note that a part of the functions of the data acquiring unit 32, coordinate calculator 33, image matching processor 34, and attitude estimator 35 may be implemented by dedicated hardware, and another part of the functions may be implemented by software or firmware. For example, the function of the data acquiring unit 32 may be implemented by a processing circuit of dedicated hardware, and the functions of the coordinate calculator 33, the image matching processor 34, and the attitude estimator 35 may be implemented by a processor including a CPU.

Figure 20:
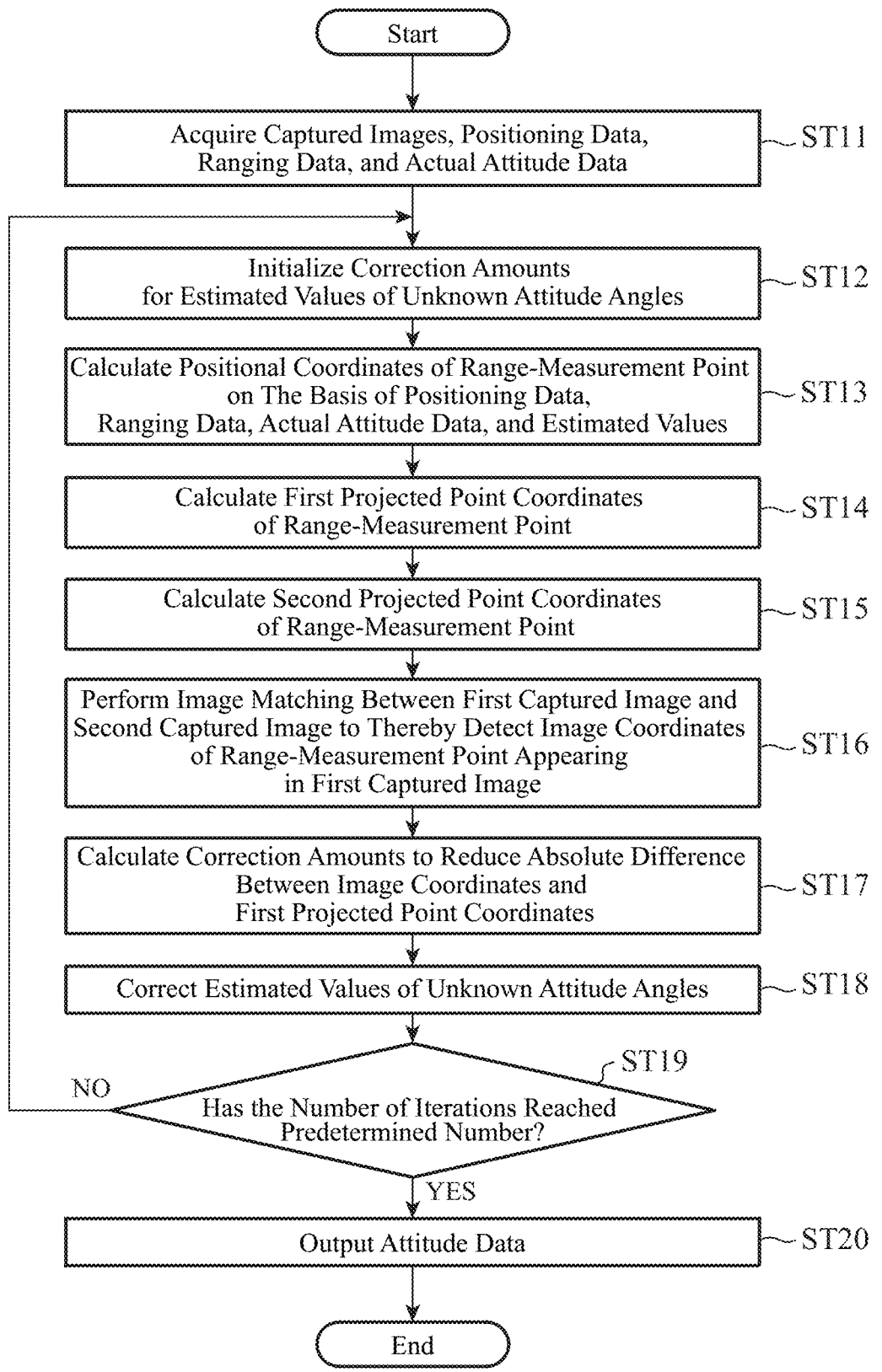
FIG. 20 is a flowchart schematically illustrating an exemplary procedure of attitude estimation processing according to the first embodiment.

Next, with reference to FIG. 20, an operation example of the attitude estimation apparatus 30 will be described below. FIG. 20 is a flowchart schematically illustrating an exemplary procedure of attitude estimation processing according to the first embodiment.

Figure 22A:
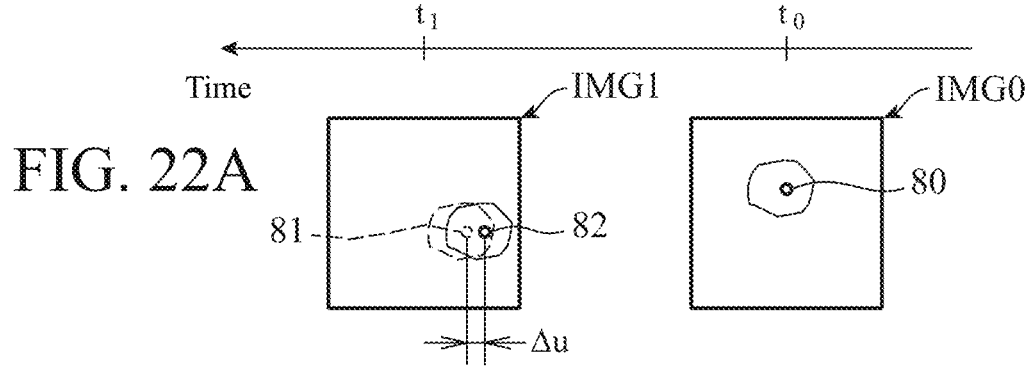
FIG. 22A is a diagram illustrating another example of captured images separately acquired at times of t=$t_0$ and $t_1$.
Figure 22B:
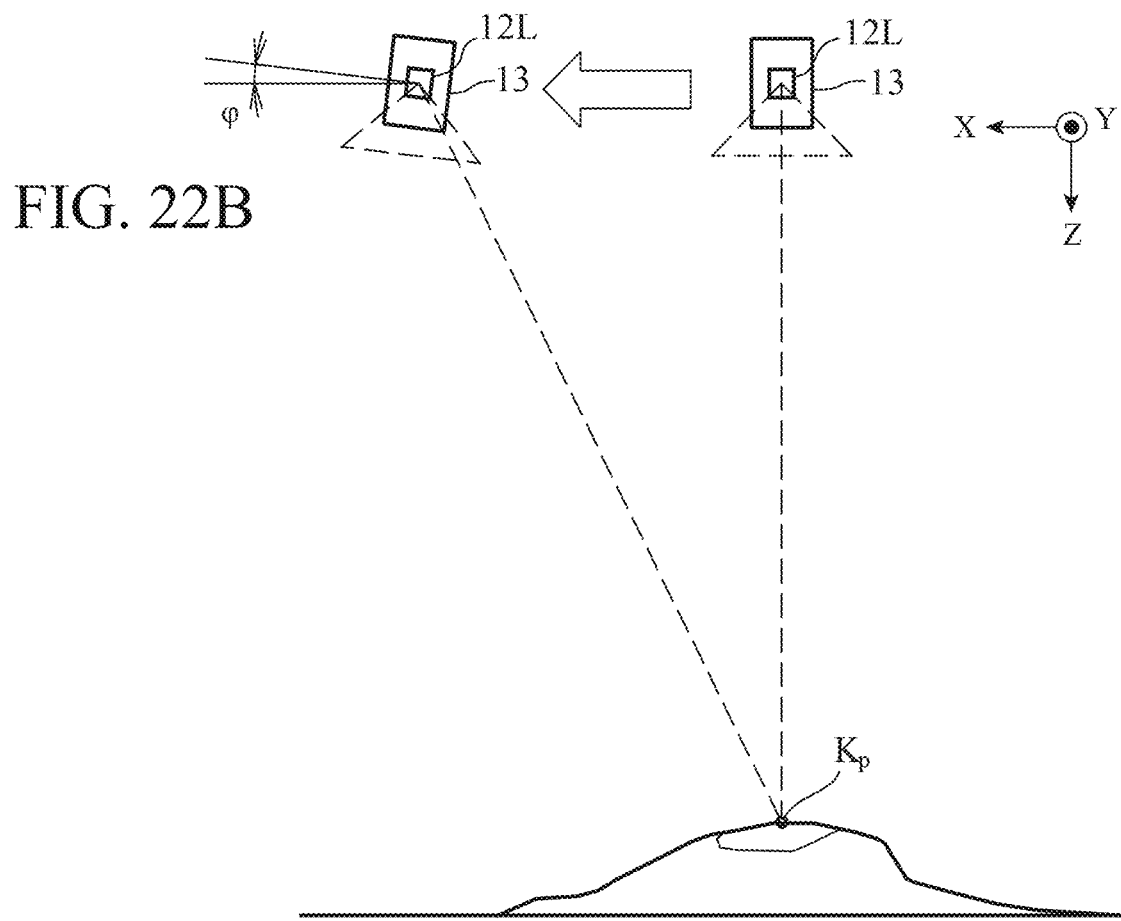
FIG. 22B is a diagram schematically illustrating a positional relation between the observation apparatus and a range-measurement point at times of t=$t_0$ and $t_1$.

Referring to FIG. 20, the data acquiring unit 32 first acquires observation data including positioning data, ranging data, actual attitude data, and captured images (step ST11). As described above, the actual attitude data represents a non-zero attitude angle when the airplane 2 is inclined. FIGS. 21A to 21C are diagrams illustrating an example of relationships among captured images IMG0 and IMG1 and a range-measurement point $K_p$ when the airplane 2 is not inclined, and FIGS. 22A and 22B are diagrams illustrating an example of relationships among captured images IMG0 and IMG1 and the range-measurement point $K_p$ when the airplane 2 is inclined. FIG. 21A is a diagram illustrating an example of arrangement of the right-side camera 12R and the left-side camera 12L at times of $t_0$ and $t_1$, and FIG. 21B is a diagram illustrating a left-side camera image IMG0 captured by the left-side camera 12L at a time of $t_0$ and a right-side camera image IMG1 captured by the right-side camera 12R at a time of $t_1$. FIG. 21C is a diagram schematically illustrating a positional relationship among the right-side camera 12R, the left-side camera 12L, and the range-measurement point $K_p$ at times of $t_0$ and $t_1$. When the airplane 2 is not inclined, range-measurement point images 80 and 81 representing the same range-measurement point $K_p$ appear in the left-side camera image IMG0 and the right-side camera image IMG1 as illustrated in FIG. 21B. On the other hand, when the airplane 2 is inclined at a time of $t_1$ as illustrated in FIG. 22B, as illustrated in FIG. 22A, a range-measurement point image 82 appears at a position shifted from the position of the range-measurement point image 81 in FIG. 21B by Au in the right-side camera image IMG1.

After step ST11, the range-measurement point coordinate calculator 33A in the coordinate calculator 33 identifies one or more unknown attitude angles which are unknown parameters, and initializes correction amounts for estimated values of the unknown attitude angles (step ST12). Specifically, the range-measurement point coordinate calculator 33A can initialize all estimated values of unknown attitude angles to 0 degrees. For example in the case where only the yaw angle is unknown out of the roll angle, the pitch angle, and the yaw angle at a time of $t_0$, and all of the roll angle, the pitch angle, and the yaw angle are unknown at a time of $t_1$, the yaw angle at a time of $t_0$ and the roll angle, the pitch angle, and the yaw angle at a time of $t_1$ are unknown attitude angles, and thus the range-measurement point coordinate calculator 33A can set estimated values of these unknown attitude angles to an initial value (0 degrees).

Next, the range-measurement point coordinate calculator 33A calculates the geodetic coordinates $Q^{(p)}$ which are position coordinates of each range-measurement point in the geodetic coordinate system on the basis of the positioning data, the ranging data, the actual attitude data, and the estimated values of the unknown attitude angles (step ST13). The method of calculating the geodetic coordinates $Q^{(p)}$ is as described above.

Next, the image coordinate calculator 33B executes the first projection transformation on the geodetic coordinates $Q^{(p)}$ of each range-measurement point from the geodetic coordinate system to the projection plane coordinate system of the right-side camera 12R to calculate coordinates of the first projected point which is two-dimensional image coordinates (step ST14) and also executes the second projection transformation on the geodetic coordinates $Q^{(p)}$ of each range-measurement point from the geodetic coordinate system to the projection plane coordinate system of the left-side camera 12L to calculate coordinates of the second projected point which is two-dimensional image coordinates (step ST15).

Specifically, in steps ST14 and ST15 the image coordinate calculator 33B first selects, from the captured images, a pair of a left-side camera image captured at the imaging time of $t=t_i$ and a right-side camera image captured at the imaging time of $t=t_j$ ($i \neq j$). The imaging times $t_i$ and $t_j$ are separated from each other by a sampling interval (data acquisition cycle) of captured images. Hereinafter, this selection of a pair is referred to as pairing. Furthermore, the right-side camera image is referred to as a first captured image, and the left-side camera image is referred to as a second captured image. For the convenience of explanation, it is assumed in the present embodiment that the imaging unit 11 captures an image of a range-measurement point for every one second. In the present embodiment, the imaging times $t_i$ and $t_j$ are different from each other although no limitation thereto is intended. The same time may be used. Furthermore, a pair of the left-side camera image and the right-side camera image is selected in the present embodiment although no limitation thereto is intended. A pair of two left-side camera images captured from different positions at different time or a pair of two right-side camera images captured from different positions at different time may be selected. By using such a pair of captured images, a change in objects in images depending upon the attitude of the airplane 2 can be used for estimation of the attitude of the airplane 2. In other words, because the change in the objects in images depending upon the attitude of the airplane 2 is used for estimation of the attitude of the airplane 2, it is not necessary to use a stabilizer for stabilizing the fields of view of the left-side camera 12L and the right-side camera 12R.

Next, the image coordinate calculator 33B converts geodetic coordinates $Q^{(p)}$ into a relative position vector $C_{Li}^{(p)}$ with the projection center of the left-side camera 12L serving as a reference from the following mathematical expression (4L) and converts the geodetic coordinates $Q^{(p)}$ into a relative position vector $C_{Rj}^{(p)}$ with the projection center of the right-side camera 12R serving as a reference from the following mathematical expression (4R).

$$C_{Li}^{(p)} = \begin{bmatrix} U_{Li}^{(p)} \\ V_{Li}^{(p)} \\ W_{Li}^{(p)} \end{bmatrix} = M(-\omega_i)M(-\varphi_i)M(-\kappa_i)(Q^{(p)} - Q_L(t_i)) \quad (4L)$$

$$C_{Rj}^{(p)} = \begin{bmatrix} U_{Rj}^{(p)} \\ V_{Rj}^{(p)} \\ W_{Rj}^{(p)} \end{bmatrix} = M(-\omega_j)M(-\varphi_j)M(-\kappa_j)(Q^{(p)} - Q_R(t_j)) \quad (4R)$$

Here, $-\omega_i$, $-\Phi_i$, and $-\kappa_i$ that define rotation matrices $M(-\omega_i)$, $M(-\Phi_i)$, and $M(-\kappa_i)$ are amounts corresponding to the roll angle, the pitch angle, and the yaw angle, respectively, at an imaging time of $t=t_i$ (including an estimated value of an unknown attitude angle). Furthermore, $Q_L(t_i)$ represents coordinates of the projection center of the left-side camera 12L at the imaging time $t_i$, and $Q_R(t_j)$ represents coordinates of the projection center of the right-side camera 12R at a time of $t_j$. The coordinates of the projection centers $Q_L(t_i)$ and $Q_R(t_j)$ are given by the following mathematical expressions (5L) and (5R).

$$Q_L(t_i) = \begin{bmatrix} X_L(t_i) \\ Y_L(t_i) \\ Z_L(t_i) \end{bmatrix} = M(\kappa_i)M(\varphi_i)M(\omega_i)R_{LC} + \begin{bmatrix} X_O(t_i) \\ Y_O(t_i) \\ Z_O(t_i) \end{bmatrix} \quad (5L)$$

$$Q_R(t_j) = \begin{bmatrix} X_R(t_j) \\ Y_R(t_j) \\ Z_R(t_j) \end{bmatrix} = M(\kappa_j)M(\varphi_j)M(\omega_j)R_{RC} + \begin{bmatrix} X_O(t_j) \\ Y_O(t_j) \\ Z_O(t_j) \end{bmatrix} \quad (5R)$$

Here, $R_{LC}$ is a relative position vector of the projection center of the left-side camera 12L, and $R_{RC}$ is a relative position vector of the projection center of the right-side camera 12R. For example, the relative position vectors $R_{LC}$ and $R_{RC}$ are given by the following mathematical expressions (6).

$$R_{LC} = [0.0, -1.0, 0.0]^T, R_{RC} = [0.0, +1.0, 0.0]^T \quad (6)$$

The image coordinate calculator 33B then calculates coordinates $S_R^{(p)}$ of the first projected point and coordinates $S_L^{(p)}$ of the second projected point from the following mathematical expressions (7) using the relative position vectors $C_{Li}^{(p)}$ and $C_{Rj}^{(p)}$.

$$S_L^{(p)} = \begin{bmatrix} x_{Li}^{(p)} \\ y_{Li}^{(p)} \end{bmatrix} = \begin{bmatrix} -f \cdot \dfrac{U_{Li}^{(p)}}{W_{Li}^{(p)}} \\ -f \cdot \dfrac{V_{Li}^{(p)}}{W_{Li}^{(p)}} \end{bmatrix}, \quad (7)$$

$$S_R^{(p)} = \begin{bmatrix} x_{Rj}^{(p)} \\ y_{Rj}^{(p)} \end{bmatrix} = \begin{bmatrix} -f \cdot \dfrac{U_{Rj}^{(p)}}{W_{Rj}^{(p)}} \\ -f \cdot \dfrac{V_{Rj}^{(p)}}{W_{Rj}^{(p)}} \end{bmatrix}$$

Here, f represents a focal length of the left-side camera 12L and the right-side camera 12R.

After the steps ST14 and ST15 described above, the image matching processor 34 performs image matching between the paired first captured image (right-side camera image) and second captured image (left-side camera image) to thereby detect image coordinates of each range-measurement point appearing in the first captured image (step ST16). Specifically, the image matching processor 34 can extract, as a template image, a local area image specified by the coordinates of the second projected point from the second captured image, perform a template matching as commonly known, between the template image and the first captured image to thereby detect image coordinates of each range-measurement point appearing in the first captured image.

Hereinafter, an x coordinate value of image coordinates of a p-th range-measurement point is represented as $SCAN_x$ ($x_{Li}^{(p)}$, $y_{Li}^{(p)}$), a y coordinate value of the image coordinate is represented as $SCAN_y$ ($x_{Li}^{(p)}$, $y_{Li}^{(p)}$) Here, ($x_{Li}^{(p)}$, $y_{Li}^{(p)}$) represents the coordinates of the second projected point of the p-th range-measurement point.

Next, the attitude estimator 35 calculates correction amounts to reduce the absolute difference between the coordinates of the first projected point and the image coordinates, for the estimated values of the unknown attitude angles (step ST17). Specifically, the correction amounts can be calculated using the nonlinear least squares method. The nonlinear least squares method will be described later. Next, the attitude estimator 35 corrects the estimated values of the unknown attitude angles using the correction amounts (step ST18). When the number of iterations of steps ST12 to ST18 has not reached a predetermined number (NO in step ST19), the attitude estimator 35 proceeds to the processing of step ST12. When steps ST12 to ST18 are iteratively performed for the predetermined number, the estimated values of the 5 unknown attitude angles converge by the correction. When the number of iterations of steps ST12 to ST18 has reached the predetermined number (YES in step ST19), the attitude estimator 35 outputs attitude data including the estimated values of the unknown attitude angles and the actual attitude data, to the memory I/F unit 31 (step ST20). The memory I/F unit 31 stores the attitude data in the memory 17. Then, the attitude estimation processing terminates.

Next, the nonlinear least squares method according to the first embodiment will be described. When there are N+1 unknown attitude angles of $\alpha_0, \alpha_1, \ldots, \alpha_N$, an unknown attitude angle vector $\alpha$ is given by the following mathematical expression (8).

$$\alpha = [\alpha_0, \alpha_1, \ldots, \alpha_N]^T = \alpha_C + \Delta\alpha \quad (8)$$

Here, $\alpha_C$ is an estimated value vector including estimated values of unknown attitude angles. In addition, $\Delta\alpha$ denotes correction amounts (a correction vector) for the estimated value vector $\alpha_C$, which is given by the following mathematical expression (9).

$$\Delta\alpha = [\delta\alpha_0, \delta\alpha_1, \ldots, \delta\alpha_N]^T \quad (9)$$

Here, observation functions $F_{xij}^{(p)}(\alpha)$ and $F_{yij}^{(p)}(\alpha)$ which represent a difference between the image coordinates of the p-th range-measurement point and the coordinates of the first projected point are defined by the following mathematical expressions (10) and (11), respectively.

$$F_{xij}^{(p)}(\alpha) = \text{SCAN}_x(x_{Li}^{(p)}, y_{Li}^{(p)}) - x_{Rj}^{(p)} \quad (10)$$

$$F_{yij}^{(p)}(\alpha) = \text{SCAN}_y(x_{Li}^{(p)}, y_{Li}^{(p)}) - y_{Rj}^{(p)} \quad (11)$$

At this time, one set of observation equations of the following mathematical expressions (12) and (13) can be set up by the nonlinear least squares method.

$$v_{xij}^{(p)} = \sum_j \left.\frac{\partial F_{xij}^{(p)}}{\partial \alpha_j}\right|_{\alpha_C} \delta\alpha_j - F_{xij}^{(p)}(\alpha_C) \quad (12)$$

$$v_{yij}^{(p)} = \sum_j \left.\frac{\partial F_{yij}^{(p)}}{\partial \alpha_j}\right|_{\alpha_C} \delta\alpha_j - F_{yij}^{(p)}(\alpha_C) \quad (13)$$

Here, a subscript $\alpha_C$ attached to the first term on the right side means to substitute a value of the estimated value vector $\alpha_C$. $v_{xij}^{(p)}$ and $v_{yij}^{(p)}$ on the left side are residuals.

The pair of the first captured image and the second captured image can be specified by a set of (i, j). Therefore, observation equations (10) and (11) can be set up for each of (i, j)=(0, 1), (1, 2), (2, 3), .... Now, a residual vector V can be defined by the following mathematical expression (14), and an error vector w can be defined by the following mathematical expression (15).

$$V = [v_{x01}^{(0)}, v_{y01}^{(0)}, v_{x01}^{(1)}, v_{y01}^{(1)}, \ldots, v_{x01}^{(N)}, v_{y01}^{(N)},$$
$$v_{x12}^{(0)}, v_{y12}^{(0)}, v_{x12}^{(1)}, v_{y12}^{(1)}, \ldots ]^T \quad (14)$$

$$w = [F_{x01}^{(0)}, F_{y01}^{(0)}, F_{x01}^{(1)}, F_{y01}^{(1)}, \ldots, F_{x01}^{(N)}, F_{y01}^{(N)},$$
$$F_{x12}^{(0)}, F_{y12}^{(0)}, F_{x12}^{(1)}, F_{y12}^{(1)}, \ldots ]^T|_{\alpha_C} \quad (14)$$

Furthermore, a design matrix $\Phi$ with the estimated value vector $\alpha_C$ can be defined by the following mathematical expression (16).

$$\Phi = \begin{bmatrix} \frac{\partial F_{x01}^{(0)}}{\partial \alpha_0} & \frac{\partial F_{x01}^{(0)}}{\partial \alpha_1} & \frac{\partial F_{x01}^{(0)}}{\partial \alpha_2} & \cdots & \frac{\partial F_{x01}^{(0)}}{\partial \alpha_N} \\ \frac{\partial F_{y01}^{(0)}}{\partial \alpha_0} & \frac{\partial F_{y01}^{(0)}}{\partial \alpha_1} & \frac{\partial F_{y01}^{(0)}}{\partial \alpha_2} & \cdots & \frac{\partial F_{y01}^{(0)}}{\partial \alpha_N} \\ \frac{\partial F_{x01}^{(1)}}{\partial \alpha_0} & \frac{\partial F_{x01}^{(1)}}{\partial \alpha_1} & \frac{\partial F_{x01}^{(1)}}{\partial \alpha_2} & \cdots & \frac{\partial F_{x01}^{(1)}}{\partial \alpha_N} \\ \frac{\partial F_{y01}^{(1)}}{\partial \alpha_0} & \frac{\partial F_{y01}^{(1)}}{\partial \alpha_1} & \frac{\partial F_{y01}^{(1)}}{\partial \alpha_2} & \cdots & \frac{\partial F_{y01}^{(1)}}{\partial \alpha_N} \\ \vdots & \vdots & \vdots & \vdots & \vdots \\ \frac{\partial F_{x01}^{(N)}}{\partial \alpha_0} & \frac{\partial F_{x01}^{(N)}}{\partial \alpha_1} & \frac{\partial F_{x01}^{(N)}}{\partial \alpha_2} & \cdots & \frac{\partial F_{x01}^{(N)}}{\partial \alpha_N} \\ \frac{\partial F_{y01}^{(N)}}{\partial \alpha_0} & \frac{\partial F_{y01}^{(N)}}{\partial \alpha_1} & \frac{\partial F_{y01}^{(N)}}{\partial \alpha_2} & \cdots & \frac{\partial F_{y01}^{(N)}}{\partial \alpha_N} \\ \frac{\partial F_{x12}^{(0)}}{\partial \alpha_0} & \frac{\partial F_{x12}^{(0)}}{\partial \alpha_1} & \frac{\partial F_{x12}^{(0)}}{\partial \alpha_2} & \cdots & \frac{\partial F_{x12}^{(0)}}{\partial \alpha_N} \\ \frac{\partial F_{y12}^{(0)}}{\partial \alpha_0} & \frac{\partial F_{y12}^{(0)}}{\partial \alpha_1} & \frac{\partial F_{y12}^{(0)}}{\partial \alpha_2} & \cdots & \frac{\partial F_{y12}^{(0)}}{\partial \alpha_N} \\ \frac{\partial F_{x12}^{(1)}}{\partial \alpha_0} & \frac{\partial F_{x12}^{(1)}}{\partial \alpha_1} & \frac{\partial F_{x12}^{(1)}}{\partial \alpha_2} & \cdots & \frac{\partial F_{x12}^{(1)}}{\partial \alpha_N} \\ \frac{\partial F_{y12}^{(1)}}{\partial \alpha_0} & \frac{\partial F_{y12}^{(1)}}{\partial \alpha_1} & \frac{\partial F_{y12}^{(1)}}{\partial \alpha_2} & \cdots & \frac{\partial F_{y12}^{(1)}}{\partial \alpha_N} \\ \vdots & \vdots & \vdots & \vdots & \vdots \\ \frac{\partial F_{x12}^{(N)}}{\partial \alpha_0} & \frac{\partial F_{x12}^{(N)}}{\partial \alpha_1} & \frac{\partial F_{x12}^{(N)}}{\partial \alpha_2} & \cdots & \frac{\partial F_{x12}^{(N)}}{\partial \alpha_N} \\ \frac{\partial F_{y12}^{(N)}}{\partial \alpha_0} & \frac{\partial F_{y12}^{(N)}}{\partial \alpha_1} & \frac{\partial F_{y12}^{(N)}}{\partial \alpha_2} & \cdots & \frac{\partial F_{y12}^{(N)}}{\partial \alpha_N} \\ \vdots & \vdots & \vdots & \vdots & \vdots \\ \vdots & \vdots & \vdots & \vdots & \vdots \end{bmatrix}_{\alpha_C} \quad (16)$$

Here, the set of observation equations can be represented by the following mathematical expression (17).

$$V = \Phi \cdot \Delta\alpha - w \quad (17)$$

The correction vector $\Delta\alpha$ that minimizes a sum of squares $V^T \cdot V$ of the residual vector V is as represented by the following mathematical expression (18)

$$\Delta\alpha = (\Phi^T \Phi)^{-1}(\Phi^T w) \quad (17)$$

Therefore, the attitude estimator 35 can calculate the correction vector $\Delta\alpha$ from mathematical expression (18) in step ST17 and can correct the estimated value in accordance with mathematical expression (8) in step ST18.

For example in a case where $\alpha_0 = \kappa_1$ (time $t_1$), $\alpha_1 = \omega_2$ (time $t_2$), $\alpha_2 = \varphi_2$ (time $t_2$), and $\alpha_3 = \kappa_2$ (time $t_2$) are given as unknown attitude angles, the correction vector $\Delta\alpha$ is expressed by the following mathematical expression (19).

$$\Delta\alpha = [\delta\kappa_1, \delta\omega_2, \delta\varphi_2, \delta\kappa_2]^T \quad (19)$$

Here, an unknown attitude angle vector $\alpha$ is given by the following mathematical expression (20).

$$\alpha = \alpha_C + \Delta\alpha = [<\kappa_1> + \delta\kappa_1, <\omega_2> + \delta\omega_2, <\varphi_2> + \delta\varphi_2, <\kappa_2> + \delta\kappa_2]^T \quad (20)$$

Here, $<\kappa_1>$, $<\omega_2>$, $<\varphi_2>$, are $<\kappa_2>$ are elements of the estimated value vector $\alpha_C$. Moreover, observation equations in this example are as expressed by the following mathematical expressions (21) and (22).

$$v_{xij}^{(p)} = \frac{\partial F_{xij}^{(p)}}{\partial \kappa_1}\bigg|_{\alpha_C} \delta\kappa_1 + \frac{\partial F_{xij}^{(p)}}{\partial \omega_2}\bigg|_{\alpha_C} \delta\omega_2 + \frac{\partial F_{xij}^{(p)}}{\partial \varphi_2}\bigg|_{\alpha_C} \delta\varphi_2 + \frac{\partial F_{xij}^{(p)}}{\partial \kappa_2}\bigg|_{\alpha_C} \delta\kappa_2 - F_{xij}^{(p)}(\alpha_C) \quad (21)$$

$$v_{yij}^{(p)} = \frac{\partial F_{yij}^{(p)}}{\partial \kappa_j}\bigg|_{\alpha_C} \delta\kappa_1 + \frac{\partial F_{yij}^{(p)}}{\partial \omega_2}\bigg|_{\alpha_C} \delta\omega_2 + \frac{\partial F_{yij}^{(p)}}{\partial \varphi_2}\bigg|_{\alpha_C} \delta\varphi_2 + \frac{\partial F_{yij}^{(p)}}{\partial \kappa_2}\bigg|_{\alpha_C} \delta\kappa_2 - F_{yij}^{(p)}(\alpha_C) \quad (22)$$

Furthermore, a design matrix Φ of the following mathematical expression (23) can be set up on the basis of these observation equations (21) and (22).

$$\Phi = \begin{bmatrix}
\partial F_{x01}^{(0)}/\partial\kappa_1 & \partial F_{x01}^{(0)}/\partial\omega_2 & \partial F_{x01}^{(0)}/\partial\varphi_2 & \partial F_{x01}^{(0)}/\partial\kappa_2 \\
\partial F_{y01}^{(0)}/\partial\kappa_1 & \partial F_{y01}^{(0)}/\partial\omega_2 & \partial F_{y01}^{(0)}/\partial\varphi_2 & \partial F_{y01}^{(0)}/\partial\kappa_2 \\
\partial F_{x01}^{(1)}/\partial\kappa_1 & \partial F_{x01}^{(1)}/\partial\omega_2 & \partial F_{x01}^{(1)}/\partial\varphi_2 & \partial F_{x01}^{(1)}/\partial\kappa_2 \\
\partial F_{y01}^{(1)}/\partial\kappa_1 & \partial F_{y01}^{(1)}/\partial\omega_2 & \partial F_{y01}^{(1)}/\partial\varphi_2 & \partial F_{y01}^{(1)}/\partial\kappa_2 \\
\partial F_{x01}^{(2)}/\partial\kappa_1 & \partial F_{x01}^{(2)}/\partial\omega_2 & \partial F_{x01}^{(2)}/\partial\varphi_2 & \partial F_{x01}^{(2)}/\partial\kappa_2 \\
\partial F_{y01}^{(2)}/\partial\kappa_1 & \partial F_{y01}^{(2)}/\partial\omega_2 & \partial F_{y01}^{(2)}/\partial\varphi_2 & \partial F_{y01}^{(2)}/\partial\kappa_2 \\
\partial F_{x01}^{(3)}/\partial\kappa_1 & \partial F_{x01}^{(3)}/\partial\omega_2 & \partial F_{x01}^{(3)}/\partial\varphi_2 & \partial F_{x01}^{(3)}/\partial\kappa_2 \\
\partial F_{y01}^{(3)}/\partial\kappa_1 & \partial F_{y01}^{(3)}/\partial\omega_2 & \partial F_{y01}^{(3)}/\partial\varphi_2 & \partial F_{y01}^{(3)}/\partial\kappa_2 \\
\partial F_{x12}^{(4)}/\partial\kappa_1 & \partial F_{x12}^{(4)}/\partial\omega_2 & \partial F_{x12}^{(4)}/\partial\varphi_2 & \partial F_{x12}^{(4)}/\partial\kappa_2 \\
\partial F_{y12}^{(4)}/\partial\kappa_1 & \partial F_{y12}^{(4)}/\partial\omega_2 & \partial F_{y12}^{(4)}/\partial\varphi_2 & \partial F_{y12}^{(4)}/\partial\kappa_2 \\
\partial F_{x12}^{(5)}/\partial\kappa_1 & \partial F_{x12}^{(5)}/\partial\omega_2 & \partial F_{x12}^{(5)}/\partial\varphi_2 & \partial F_{x12}^{(5)}/\partial\kappa_2 \\
\partial F_{y12}^{(5)}/\partial\kappa_1 & \partial F_{y12}^{(5)}/\partial\omega_2 & \partial F_{y12}^{(5)}/\partial\varphi_2 & \partial F_{y12}^{(5)}/\partial\kappa_2 \\
\partial F_{x12}^{(6)}/\partial\kappa_1 & \partial F_{x12}^{(6)}/\partial\omega_2 & \partial F_{x12}^{(6)}/\partial\varphi_2 & \partial F_{x12}^{(6)}/\partial\kappa_2 \\
\partial F_{y12}^{(6)}/\partial\kappa_1 & \partial F_{y12}^{(6)}/\partial\omega_2 & \partial F_{y12}^{(6)}/\partial\varphi_2 & \partial F_{y12}^{(6)}/\partial\kappa_2 \\
\partial F_{x12}^{(7)}/\partial\kappa_1 & \partial F_{x12}^{(7)}/\partial\omega_2 & \partial F_{x12}^{(7)}/\partial\varphi_2 & \partial F_{x12}^{(7)}/\partial\kappa_2 \\
\partial F_{y12}^{(7)}/\partial\kappa_1 & \partial F_{y12}^{(7)}/\partial\omega_2 & \partial F_{y12}^{(7)}/\partial\varphi_2 & \partial F_{y12}^{(7)}/\partial\kappa_2 \\
\partial F_{x23}^{(8)}/\partial\kappa_1 & \partial F_{x23}^{(8)}/\partial\omega_2 & \partial F_{x23}^{(8)}/\partial\varphi_2 & \partial F_{x23}^{(8)}/\partial\kappa_2 \\
\partial F_{y23}^{(8)}/\partial\kappa_1 & \partial F_{y23}^{(8)}/\partial\omega_2 & \partial F_{y23}^{(8)}/\partial\varphi_2 & \partial F_{y23}^{(8)}/\partial\kappa_2 \\
\partial F_{x23}^{(9)}/\partial\kappa_1 & \partial F_{x23}^{(9)}/\partial\omega_2 & \partial F_{x23}^{(9)}/\partial\varphi_2 & \partial F_{x23}^{(9)}/\partial\kappa_2 \\
\partial F_{y23}^{(9)}/\partial\kappa_1 & \partial F_{y23}^{(9)}/\partial\omega_2 & \partial F_{y23}^{(9)}/\partial\varphi_2 & \partial F_{y23}^{(9)}/\partial\kappa_2 \\
\partial F_{x23}^{(10)}/\partial\kappa_1 & \partial F_{x23}^{(10)}/\partial\omega_2 & \partial F_{x23}^{(10)}/\partial\varphi_2 & \partial F_{x23}^{(10)}/\partial\kappa_2 \\
\partial F_{y23}^{(10)}/\partial\kappa_1 & \partial F_{y23}^{(10)}/\partial\omega_2 & \partial F_{y23}^{(10)}/\partial\varphi_2 & \partial F_{y23}^{(10)}/\partial\kappa_2 \\
\partial F_{x23}^{(11)}/\partial\kappa_1 & \partial F_{x23}^{(11)}/\partial\omega_2 & \partial F_{x23}^{(11)}/\partial\varphi_2 & \partial F_{x23}^{(11)}/\partial\kappa_2 \\
\partial F_{y23}^{(11)}/\partial\kappa_1 & \partial F_{y23}^{(11)}/\partial\omega_2 & \partial F_{y23}^{(11)}/\partial\varphi_2 & \partial F_{y23}^{(11)}/\partial\kappa_2
\end{bmatrix}_{\alpha_C} \quad (23)$$

FIG. 23A is a table illustrating numerical examples (p denotes a number of a range-measurement point) of geodetic coordinates ($X_G$, $Y_G$, $Z_G$) of each of the zeroth to eleventh range-measurement point s calculated from mathematical expression (1), and FIG. 23B is a table illustrating numerical examples of coordinates of projection centers ($X_L$, $Y_L$, $Z_L$) and ($X_R$, $Y_R$, $Z_R$) calculated from mathematical expressions (5L) and (5R). right-side camera images and left-side camera images are captured at each of time $t_0$=0.0, $t_1$=1.0, $t_2$=2.0, and $t_3$=3.0. FIG. 24 is a table illustrating numerical examples of the coordinates of the first projected point ($x_R$, $Y_R$) and the coordinates of the second projected point ($x_L$, $Y_L$) calculated from mathematical expression (7). FIG. 25 is a table illustrating numerical examples of image coordinates ($SCAN_x(x_{Li}, y_{Li})$, $SCAN_y(x_{Li}, y_{Li})$). When $\alpha_0=\kappa_1$ (time $t_1$), $\alpha_1=\omega_2$ (time $t_2$), $\alpha_2=\varphi_2$ (time $t_2$), and $\alpha_3=\kappa_2$ (time $t_2$) are given, an error vector w in FIG. 26, a design matrix Φ in FIG. 27, and a correction vector Δα in FIG. 28 can be calculated using the numerical values illustrated in FIGS. 23A and 23B, 24, and 25, respectively. Also, as illustrated in FIG. 29, it is confirmed that attitude data at times of t=0.00, 1.00, 2.00, and 3.00 can be obtained.

As stereo image processing for searching corresponding points between images captured by cameras at different positions to acquire three-dimensional information such as the distances to an observation target and depth information, a method called fixed stereo and a method called motion stereo are known. The fixed stereo is a method for imaging with two cameras arranged apart. Pairing of a left-side camera image at a time of $t_i$ and a right-side camera image at a time of $t_j$ corresponds to fixed stereo. Meanwhile, the motion stereo is a method of imaging from different imaging positions while causing a camera to fly. Pairing of a camera image at a time of $t_i$ and a camera image at a time of $t_j$ corresponds to motion stereo.

In the above description, the configuration of using the left-side camera 12L and the right-side camera 12R has been described; however, a single camera may be used. In this case, a pair of a camera image at a time of $t_i$ and a camera image at a time of $t_j$ can be used.

Furthermore, in the above description, an unknown parameter is one of the three parameters of attitude angles at each time; however, six parameters including three-dimensional position coordinates of the airplane 2 may be used, or an internal parameter such as the focal length f may also be included.

As described above, the observation system 1 of the first embodiment focuses on the fact that coordinates of mutually-corresponding points between images captured at different imaging positions are shifted depending on the attitude of the airplane 2, and is capable of correcting estimated values of one or more unknown attitude angles to reduce the absolute difference between these sets of coordinates. Therefore, the attitude of the airplane 2 can be estimated with high accuracy without using an IMU or a stabilizer.

Note that in the first embodiment calculation of coordinates is executed assuming that an initial value of an estimated value of the rotation angle κ is 0 degrees; however, an approximate solution of the rotation angle κ can be derived also from a time series of positioning coordinates measured by the GNSS positioning device 14. Therefore, the initial value of the estimated value of the rotation angle κ may be set as the approximate solution.

Furthermore, in the observation system 1 of the first embodiment, the memory 17 which is a portable recording medium is used while incorporated in the airplane 2. By using observation data accumulated in the memory 17 during flight of the airplane 2 in this manner, it is possible to estimate an attitude angle of the airplane 2 after flight is completed, and thus a survey result can be corrected using the estimated attitude angle.

Second Embodiment

Figure 30:
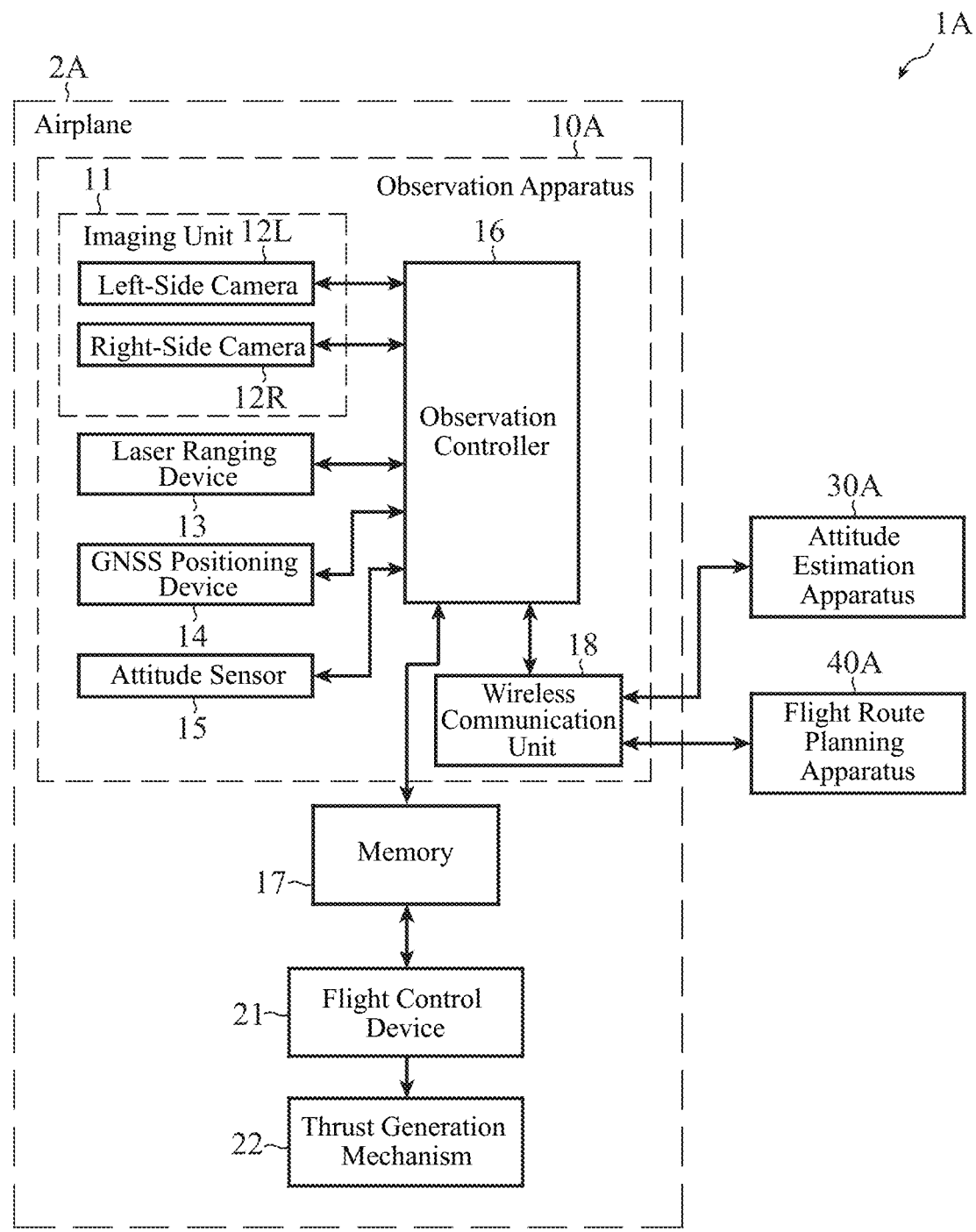
FIG. 30 is a block diagram illustrating a schematic configuration of an observation system of a second embodiment of the present invention.

Next, a second embodiment according to the present invention will be described. FIG. 30 is a block diagram illustrating a schematic configuration of an observation system 1A of the second embodiment in accordance with the present invention. As illustrated in FIG. 30, the observation system 1A includes an airplane 2A including an observation apparatus 10A, a memory 17, a flight control device 21, and a thrust generation mechanism 22, an attitude estimation apparatus 30A, and a flight route planning apparatus 40A.

A configuration of the observation apparatus 10A incorporated in the airplane 2A is the same as the configuration of the observation apparatus 10 of the first embodiment described above except for a wireless communication unit 18 included therein. The wireless communication unit 18 has a function of executing wireless communication with the attitude estimation apparatus 30A and the flight route planning apparatus 40A to transmit and receive data such as route data or observation data.

Figure 31:
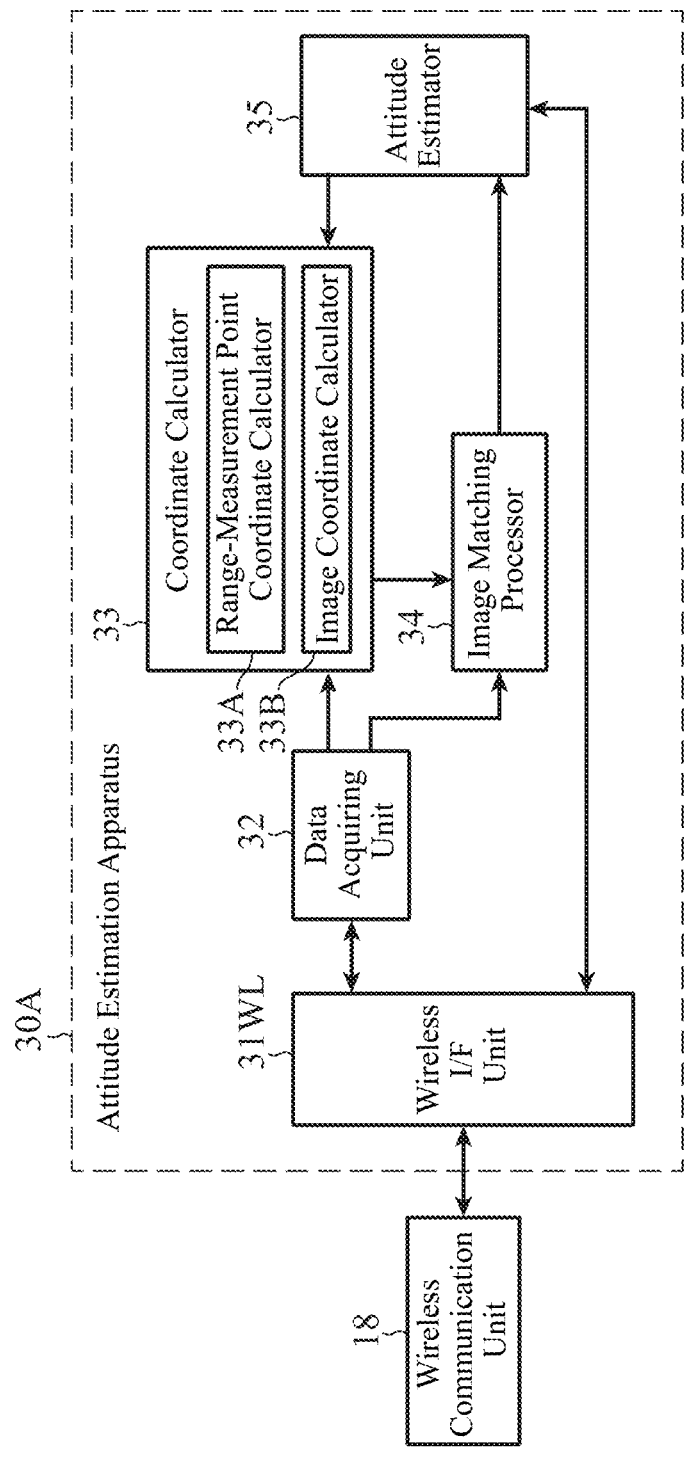
FIG. 31 is a block diagram illustrating a schematic configuration of an attitude estimation apparatus of the second embodiment.

FIG. 31 is a block diagram illustrating a schematic configuration of the attitude estimation apparatus 30A of the second embodiment. A configuration of the attitude estimation apparatus 30A is the same as the configuration of the attitude estimation apparatus 30 of the first embodiment except for a wireless interface unit (wireless I/F unit) 31WL included therein instead of the memory I/F unit 31 of FIG. 18. Since the wireless I/F unit 31WL has a function of wirelessly communicating with the wireless communication unit 18 of the observation apparatus 10A illustrated in FIG. 30, the wireless I/F unit 31WL can receive data such as the above observation data from the wireless communication unit 18 and transmit attitude data generated by an attitude estimator 35 to the wireless communication unit 18.

Figure 32:
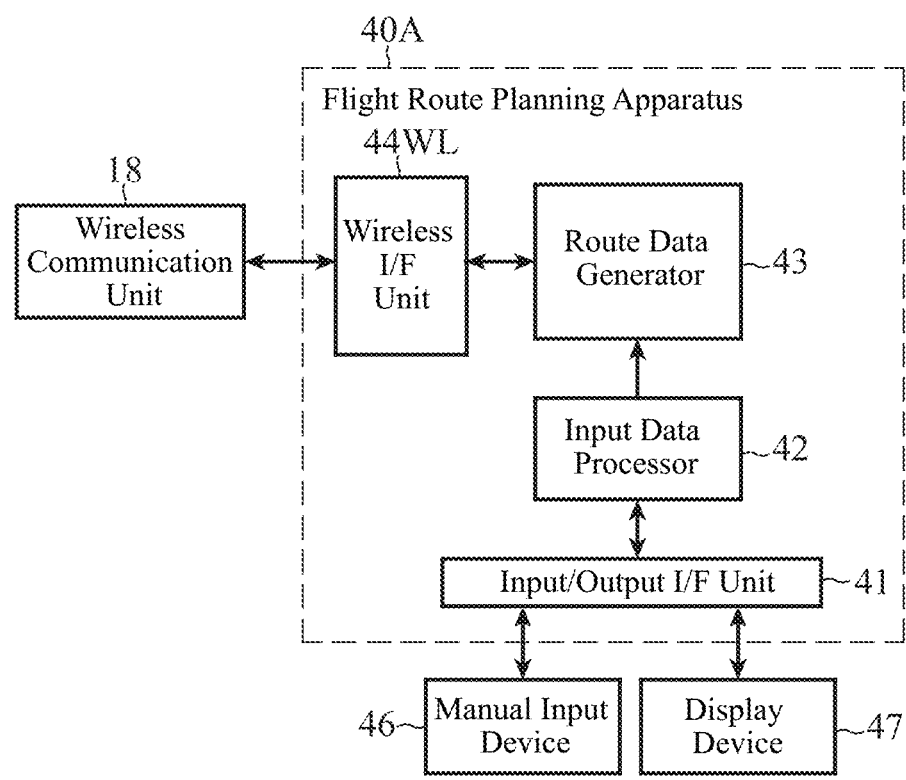
FIG. 32 is a block diagram illustrating a schematic configuration of a flight route planning apparatus of the second embodiment.

FIG. 32 is a block diagram illustrating a schematic configuration of the flight route planning apparatus 40A of the second embodiment. A configuration of the flight route planning apparatus 40A is the same as the configuration of the flight route planning apparatus 40 of the first embodiment except for a wireless interface unit (wireless I/F unit) 44WL included therein instead of the memory I/F unit 44 of FIG. 3. Since the wireless I/F unit 44WL has a function of wirelessly communicating with the wireless communication unit 18 of the observation apparatus 10A illustrated in FIG. 30, the wireless I/F unit 44WL can transmit route data and cycle data generated by a route data generator 43 to the wireless communication unit 18. The observation controller 16 is capable of controlling an imaging unit 11, a laser ranging device 13, a GNSS positioning device 14, and an attitude sensor 15 by using the cycle data received by the wireless communication unit 18.

In addition, the observation controller 16 stores the route data received by the wireless communication unit 18 in the memory 17. The flight control device 21 is capable of controlling the speed, a travelling course, and the attitude of the airplane 2 on the basis of the route data. Therefore, the flight route planning apparatus 40A is capable of remotely controlling the airplane 2 by supplying route data to the in-flight airplane 2A in real time without using the memory 17.

Although various embodiments in accordance with the present invention have been described with reference to the drawings, these embodiments are examples of the present invention, and thus variations other than those embodiments can be adopted. Within the scope of the present invention, flexible combinations of the first and second embodiments, modifications of any component of each of the embodiments, or neglect of any component in each of the embodiments can be made.

INDUSTRIAL APPLICABILITY

An attitude estimation apparatus, observation system, and attitude estimation method in accordance with the present invention allow for very accurate estimation of an attitude of a flying object incorporating an observation device and thus are applicable to, for example, a surveying system and a navigation system for an UAV.

REFERENCE SIGNS LIST 1, 1A: Observation systems; 2, 2A: Airplanes; 10, 10A: Observation apparatuses; 11: Imaging unit; 12L: Left-side camera; 12R: Right-side camera; 13: Laser ranging device; 14: GNSS positioning device; 15: Attitude sensor; 16: Observation controller; 17: Memory; 18: Wireless communication unit; 19R, 19L: Arms; 20: Airframe; 21: Flight control device; 22: Thrust generation mechanism; 22A to 22F: Thrust generators; 30, 30A: Attitude estimation apparatuses; 30S: Information processing apparatus; 30H: Information processing apparatus; 31: Memory interface unit (memory I/F unit); 31WL: Wireless interface unit (wireless I/F unit); 32: Data acquiring unit; 33: Coordinate calculator; 33A: Range-measurement point coordinate calculator; 33B: Image coordinate calculator; 34: Image matching processor; 35: Attitude estimator; 40, 40A: Flight route planning apparatuses; 40S: Information processing apparatus; 40H: Information processing apparatus; 41: Input/output interface unit (input/output I/F unit); 42: Input data processor; 43: Route data generator; 44: Memory interface unit (memory I/F unit); 44WL: Wireless interface unit (wireless I/F unit); 46: Manual input device; 47: Display device; 50: Processor; 50c: CPU; 51: Memory interface circuit (memory I/F circuit); 52: RAM; 53: Nonvolatile memory; 54: Signal path; 56: Processing circuit; 57: Memory interface circuit (memory I/F circuit); 58: Signal path; 60: Processor; 60c: CPU; 61: Memory interface circuit (memory I/F circuit); 61: Memory I/F circuit; 62: RAM; 63: Nonvolatile memory; 64A: Input interface circuit (input I/F circuit); 64B: Display interface circuit (display I/F circuit); 65: Signal path; 66: Processing circuit; 67: Memory I/F circuit; 68A: Input interface circuit (input I/F circuit); 68B: Display interface circuit (display I/F circuit); and 69: Signal path.

The invention claimed is:

1. An attitude estimation apparatus which operates in cooperation with an observation apparatus comprising: a positioning device configured to output positioning data indicating a position of a flying object in a geodetic coordinate system; a ranging device configured to measure a distance from the flying object to a range-measurement point located on a ground and measure an angular direction with respect to the range-measurement point, to thereby output ranging data; an imaging unit configured to capture images of the range-measurement point as seen from a plurality of imaging positions while incorporated in the flying object and output the captured images; and an attitude sensor configured to detect an attitude of the flying object with respect to a gravitational direction, to thereby output actual attitude data, the attitude estimation apparatus comprising information processing circuitry configured to:
acquire the positioning data, the ranging data, the actual attitude data, and the captured images from the observation apparatus;
perform an attitude estimate process by iteratively performing operations, in accordance with a nonlinear least squares method, to
calculate geodetic coordinates indicating a position of the range-measurement point in the geodetic coordinate system, using the positioning data, the ranging data, the actual attitude data, and estimated values of one or more unknown parameters representing the attitude of the flying object;

calculate coordinates of a first projected point by performing a projection transformation of the geodetic coordinates from the geodetic coordinate system to an image coordinate system with the projection center of a first captured image serving as a reference;

calculate coordinates of a second projected point by performing a projection transformation of the geodetic coordinates from the geodetic coordinate system to an image coordinate system with the projection center of a second captured image serving as a reference;

perform image matching between the first captured image and the second captured image which are selected from the captured images, by extracting, as a template image, a local area image specified by the coordinates of a projected point from the second captured image and performing a template matching between the template image and the first captured image, to thereby detect image coordinates of the range-measurement point appearing in the first captured image; and correct the estimated values of the one or more unknown parameters to thereby reduce an absolute difference between the coordinates of the projected point and the image coordinates; and when the number of iterations has reached a predetermined number, outputting attitude data.

2. The attitude estimation apparatus according to claim 1, wherein the first captured image and the second captured image are captured at a first imaging time and a second imaging time that are different times, respectively.

3. The attitude estimation apparatus according to claim 2, wherein the imaging unit includes a first imaging unit and a second imaging unit which are arranged at different positions, the first imaging unit outputting the first captured image and the second imaging unit outputting the second captured image.

4. The attitude estimation apparatus according to claim 1, wherein the positioning device receives navigation signals from a plurality of satellites which are part of a global navigation satellite system, and generates the positioning data by analyzing the navigation signals.

5. The attitude estimation apparatus according to claim 1, wherein the ranging device emits laser light toward the range-measurement point and receives reflected laser light from the range-measurement point to measure the distance and the angular direction.

6. An observation system comprising an observation apparatus and an attitude estimation apparatus which operates in cooperation with the observation apparatus, the observation apparatus including: a positioning device configured to output positioning data indicating a position of a flying object in a geodetic coordinate system; a ranging device configured to measure a distance from the flying object to a range-measurement point located on a ground and measure an angular direction with respect to the range-measurement point, to thereby output ranging data; an imaging unit configured to capture images of the range-measurement point as seen from a plurality of imaging positions while incorporated in the flying object and output the captured images; and an attitude sensor configured to detect an attitude of the flying object with respect to a gravitational direction, to thereby output actual attitude data, and the attitude estimation apparatus including information processing circuitry configured to:

acquire the positioning data, the ranging data, the actual attitude data, and the captured images from the observation apparatus;

perform an attitude estimate process by iteratively performing operations, in accordance with a nonlinear least squares method, to calculate geodetic coordinates indicating a position of the range-measurement point in the geodetic coordinate system, using the positioning data, the ranging data, the actual attitude data, and estimated values of one or more unknown parameters representing the attitude of the flying object;

calculate coordinates of a first projected point by performing a projection transformation of the geodetic coordinates from the geodetic coordinate system to an image coordinate system with the projection center of a first captured image serving as a reference;

calculate coordinates of a second projected point by performing a projection transformation of the geodetic coordinates from the geodetic coordinate system to an image coordinate system with the projection center of a second captured image serving as a reference;

perform image matching between the first captured image and the second captured image which are selected from the captured images, by extracting, as a template image, a local area image specified by the coordinates of a projected point from the second captured image and performing a template matching between the template image and the first captured image, to thereby to detect image coordinates of the range-measurement point appearing in the first captured image; and correct the estimated values of the one or more unknown parameters to thereby reduce an absolute difference between the coordinates of the projected point and the image coordinates; and when the number of iterations has reached a predetermined number, outputting attitude data.

7. The observation system according to claim 6, further comprising a flight route planning apparatus for setting a flight route of the flying object, the flight route planning apparatus including:

an input data processor to receive input data instructing the flight route; and a route data generator to generate route data defining the flight route on a basis of the input data received by the input data processor, wherein the flying object includes a flight control device which allows the flying object to fly along the flight route defined by the route data.

8. The observation system according to claim 7, wherein:

the flight route planning apparatus further includes an input interface unit connected to a manual input device which detects a manual input provided by a user; and the input interface unit supplies as the input data the manual input detected by the manual input device, to the input data processor.

9. The observation system according to claim 7, wherein the flight route planning apparatus further includes a memory interface unit for storing the route data in a recording medium.

10. The observation system according to claim 7, wherein:
the flight route planning apparatus further includes a wireless interface unit for wirelessly transmitting the route data; and
the flying object further includes
a wireless communication unit for receiving the route data from the wireless interface unit, and
a flight control device for allowing the flying object to fly along the flight route defined by the route data received by the wireless communication unit.

11. The observation system according to claim 6, wherein:
the observation apparatus further includes a wireless communication unit for wirelessly transmitting observation data which contains the positioning data, the ranging data, the actual attitude data, and the captured images; and
the attitude estimation apparatus further includes a wireless interface unit for receiving the observation data from the wireless communication unit.

12. The observation system according to claim 7, wherein the ranging unit scans the ground with laser light and receives reflected laser light from the range-measurement point to measure the distance and the angular direction.

13. The observation system according to claim 12, wherein:
the flight control device allows the flying object to automatically fly in a predetermined direction along a first flight route defined by the route data and thereafter allow the flying object to automatically fly in a direction opposite to the predetermined direction along a second flight route parallel to the first flight route; and
a scanning range using the laser light when the flying object flies along the first flight route overlaps with a scanning range using the laser light when the flying object flies along the second flight route.

14. The observation system according to claim 13, wherein the predetermined direction is a uniaxial direction.

15. An attitude estimation method to be executed in an attitude estimation apparatus which operates in cooperation with an observation apparatus comprising: a positioning device configured to output positioning data indicating a position of a flying object in a geodetic coordinate system; a ranging device configured to measure a distance from the flying object to a range-measurement point located on a ground and measure an angular direction with respect to the range-measurement point, to thereby output ranging data; an imaging unit configured to capture images of the range-measurement point as seen from a plurality of imaging positions while incorporated in the flying object and output the captured images; and an attitude sensor configured to detect an attitude of the flying object with respect to a gravitational direction, to thereby output actual attitude data, the attitude estimation method comprising the steps of:
acquiring the positioning data, the ranging data, the actual attitude data, and the captured images from the observation apparatus;
performing an attitude estimate process by iteratively, in accordance with a nonlinear least squares method,
calculating geodetic coordinates indicating a position of the range-measurement point in the geodetic coordinate system using the positioning data, the ranging data, the actual attitude data, and estimated values of one or more unknown parameters representing the attitude of the flying object;
calculating coordinates of first projected point by performing a projection transformation of the geodetic coordinates from the geodetic coordinate system to an image coordinate system with the projection center of a first captured image serving as a reference;
calculating coordinates of a second projected point by performing a projection transformation of the geodetic coordinates from the geodetic coordinate system to an image coordinate system with the projection center of a second captured image serving as a reference;
performing image matching between the first captured image and the second captured image which are selected from the captured images, by extracting, as a template image, a local area image specified by the coordinates of a projected point from the second captured image and performing a template matching between the template image and the first captured image, to thereby detect image coordinates of the range-measurement point appearing in the first captured image; and
correcting the estimated values of the one or more unknown parameters to thereby reduce an absolute difference between the coordinates of the projected point and the image coordinates; and
when the number of iterations has reached a predetermined number, outputting attitude data.

* * * * *